(12) United States Patent
Baek et al.

(10) Patent No.: US 12,524,471 B2
(45) Date of Patent: *Jan. 13, 2026

(54) SEEDING AND GENERATING SUGGESTED CONTENT COLLECTIONS

(71) Applicant: Dropbox, Inc., San Francisco, CA (US)

(72) Inventors: Jongmin Baek, Foster City, CA (US); Jiarui Ding, San Jose, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,008

(22) Filed: Mar. 14, 2024

(65) Prior Publication Data
US 2024/0273145 A1 Aug. 15, 2024

Related U.S. Application Data

(63) Continuation of application No. 17/815,478, filed on Jul. 27, 2022, now Pat. No. 11,947,601.

(51) Int. Cl.
*G06F 16/906* (2019.01)
*G06F 3/0482* (2013.01)
*G06F 16/9035* (2019.01)

(52) U.S. Cl.
CPC .......... *G06F 16/906* (2019.01); *G06F 3/0482* (2013.01); *G06F 16/9035* (2019.01)

(58) Field of Classification Search
CPC ..... G06N 20/00; G06F 16/9535; G06F 16/35; G06F 16/355; G06F 16/906; G06F 3/0482
See application file for complete search history.

(56) References Cited

U.S. PATENT DOCUMENTS

| | | | |
|---|---|---|---|
| 9,658,752 B2 | 5/2017 | McCoy et al. | |
| 10,430,421 B2 | 10/2019 | Keggi et al. | |
| 11,012,749 B2 | 5/2021 | Kimble et al. | |
| 2014/0223099 A1 | 8/2014 | Kidron et al. | |
| 2017/0103343 A1* | 4/2017 | Yee | G06N 7/01 |
| 2018/0181572 A1* | 6/2018 | Guo | G06F 16/24578 |
| 2020/0125574 A1 | 4/2020 | Ghoshal et al. | |
| 2021/0142118 A1 | 5/2021 | Lugt et al. | |
| 2021/0326674 A1 | 10/2021 | Liu et al. | |

(Continued)

OTHER PUBLICATIONS

Non-Final Office Action from U.S. Appl. No. 17/815,478, mailed Sep. 14, 2023, 19 pages.

(Continued)

*Primary Examiner* — Hau H Hoang
(74) *Attorney, Agent, or Firm* — Keller Preece PLLC

(57) ABSTRACT

The present disclosure is directed toward systems, methods, and non-transitory computer readable media for generating and suggesting content collections for user accounts of a content management system using combinations of content-based features such as textual signals and visual signals. In some embodiments, the disclosed systems select a seed content item from among a plurality of content items associated with a user account within a content management system. From the seed content item, the disclosed systems can determine one or more germane topics and can cluster additional content items in relation to the germane topic(s). In addition, the disclosed systems can select one or more content items from a content cluster to provide as a suggested content collection.

20 Claims, 11 Drawing Sheets

(56) References Cited

U.S. PATENT DOCUMENTS

2021/0349960 A1   11/2021   Hennekey et al.
2022/0012565 A1    1/2022   Hansen et al.
2022/0107978 A1    4/2022   Steffensen et al.

OTHER PUBLICATIONS

Notice of Allowance from U.S. Appl. No. 17/815,478, mailed Jan. 26, 2024, 8 pages.
Rowe M., et al., "Anticipating Discussion Activity on Community Forums," The Third IEEE International Conference on Social Computing, 2011, 8 pages.

* cited by examiner

SEEDING AND GENERATING SUGGESTED CONTENT COLLECTIONS

CROSS REFERENCE TO RELATED APPLICATIONS

This application is a continuation of U.S. application Ser. No. 17/815,478 filed on Jul. 27, 2022. The aforementioned application is hereby incorporated by reference in its entirety.

BACKGROUND

Advancements in computing devices and networking technology have given rise to a variety of innovations in cloud-based digital content storage and sharing. For example, online digital content systems can provide access to digital content items across devices all over the world. Existing systems can also synchronize changes to shared digital content across different types of devices operating on different platforms. Indeed, modern online digital content systems can provide access to digital content for users to collaborate across diverse physical locations and over a variety of computing devices. Despite these advances, however, existing digital content systems continue to suffer from a number of disadvantages, particularly in terms of accuracy and efficiency.

As just suggested, some existing digital content systems are inaccurate. In particular, many existing systems are tied to grouping content items into collections according to access patterns. For example, due to the limited capabilities of many existing systems, they are often limited in their determination of groupings for content items to be based solely on access patterns. Specifically, existing systems sometimes group according to access patterns where the system determines that content items belong to a common group based on when a user account accesses the content items relative to one another. However, basing content groupings so heavily on access patterns can be misleading in many instances. As a result, the content groupings of existing systems can often include unrelated content items that have little to do with one another, where the content items include disparate subject matter and/or were accessed as part of different projects entirely and should not be grouped together.

Due at least in part to their inaccuracies, many existing digital content systems are inefficient. To elaborate, because of their inaccurate grouping of content items, some existing systems require excessive numbers of user interactions to relocate misplaced content items to storage locations that are more appropriate. In addition, some existing systems require client device interactions to move individual content items into a common group and/or to manually request the system to generate a grouping of content items (e.g., by providing various parameters such as access times and a destination location for the grouping). Processing the excessive numbers of user interactions involved in existing systems (e.g., in generating content groupings) consumes computing resources such as processing power and memory that could otherwise be preserved with more efficient systems and/or user interfaces.

Thus, there are several disadvantages with regard to existing digital content systems.

SUMMARY

This disclosure describes one or more embodiments of systems, methods, and non-transitory computer readable storage media that provide benefits and/or solve one or more of the foregoing and other problems in the art. For instance, the disclosed systems provide a new method for generating and suggesting content collections for user accounts of a content management system using combinations of content-based features such as textual signals and visual signals. In some embodiments, the disclosed systems select a seed content item from among a plurality of content items associated with a user account within a content management system. From the seed content item, the disclosed systems can determine one or more germane topics and can cluster additional content items in relation to the germane topic(s). In addition, the disclosed systems can select one or more content items from a content cluster to provide as a suggested content collection.

Additional features of the disclosed systems are described below.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
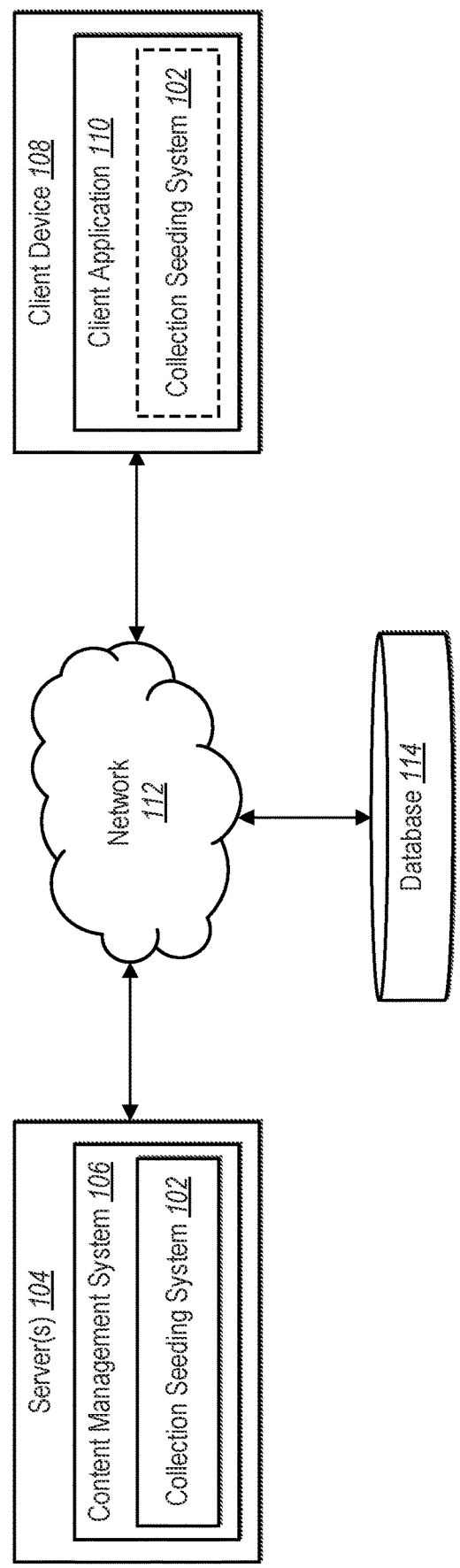
FIG. 1 illustrates a schematic diagram of an example environment of a collection seeding system in accordance with one or more embodiments.

This disclosure describes one or more embodiments of a collection seeding system that can utilize advanced content analysis to automatically and intelligently seed generation of content collections from content items of a content management system. In particular, the collection seeding system can select a seed content item from content items associated with a user account (e.g., within a cloud-based content management system). For example, the collection seeding system can utilize a seed prediction machine learning model to predict a content item that a user account is likely to access as a seed content item. In addition, the collection seeding system can determine or extract one or more germane topics and/or object (or image) classifications from the seed content item. Based on the germane topic(s) (or classification (s)), the collection seeding system can cluster additional content items into content clusters according to their relationships with the germane topic(s). The collection seeding system can also select one or more content items from a content cluster to provide as a suggested content collection. Specifically, the collection seeding system can utilize one or more models to cluster content items and to further compare the content clusters to select a cluster (from which to select a subset of content items) to use as a suggested content collection. Thus, the collection seeding system utilizes the seed content item to seed generation of content clusters and, ultimately, generation of a suggested content collection.

In some embodiments, the collection seeding system can select a seed content item based on content clusters associated with multiple candidate seed content items. For example, the collection seeding system can identify candidate seed content items, determine germane topics from the candidate seed content items, and generate content clusters for the germane topics of the various candidate seed content items. The collection seeding system can further select a seed content item from among the candidate seed content items based on the content clusters. For instance, the collection seeding system can select a seed content item that results in a most relevant content cluster in relation to a user account.

As just mentioned, the collection seeding system can select a seed content item. In particular, the collection seeding system can analyze content items associated with a user account of a content management system to identify a content item for seeding a new content collection to suggest to the user account. For example, the collection seeding system analyzes account activity associated with the user account in relation to various content items to determine relevance scores for the content items. As another example, the collection seeding system utilizes a seed prediction machine learning model to predict a content item that a user account has at least a threshold probability of accessing to use as a seed content item. In some cases, the collection seeding system selects a seed content item based on content clusters associated with a plurality of candidate seed content items. For instance, the collection seeding system identifies candidate seed content items based on a machine learning model prediction and/or account activity, and the collection seeding system selects a seed content item from the candidates based on relevance of content clusters associated with the candidates in relation to a user account. Additional detail regarding selecting a seed content item is provided below with reference to the figures.

As also mentioned above, the collection seeding system can determine or extract a germane topic from a seed content item. More specifically, the collection seeding system can utilize one or more models, such as a topic prediction machine learning model, to determine a topic associated with a content item. For instance, the collection seeding system can analyze a text document, a digital video, a digital image, an audio clip, a spreadsheet, or some other type of content item to determine various topics reflected by, or corresponding to, the content item. In some cases, such as in cases where a content item is a digital image or a digital video depicting various objects, the collection seeding system can determine one or more object classifications for objects depicted within the content item. In some embodiments, the collection seeding system can determine an image classification (or a video classification or an audio classification) for the depiction of the content item as a whole. In certain cases, the collection seeding system not only determines a topic and/or classification for a seed content item, but further determines that the topic and/or classification is germane to the user account (and therefore effective to use as a seed for a new content collection). Additional detail regarding determining germane topics and/or germane object classifications is provided below with reference to the figures.

In one or more embodiments, the collection seeding system can generate content clusters based on the germane topic(s) or object classification(s) of the seed content item. For example, the collection seeding system can utilize one or more content clustering models to generate content clusters relative to germane topic(s)/classification(s). In particular, the collection seeding system can determine topics and/or classifications for other content items within the content managements system to compare with the germane topic/classification of the seed content item. The collection seeding system can further rank content items based on closeness or relevance to the germane topic (or the germane object classification). In some cases, the collection seeding system queries the content management system using a germane topic (or a germane object classification) as a query to identify content items corresponding to the query from which to perform the ranking. Additional detail regarding generating content clusters is provided below with reference to the figures.

As mentioned above, the collection seeding system can further compare content clusters to generate a suggested content collection. More specifically, the collection seeding system can compare content clusters based on relevance to a user account and/or relevance to a germane topic (or a germane object classification). In some cases, the collection seeding system can rank content clusters and can select a highest ranked cluster for generating a suggested content collection. Indeed, the collection seeding system can select a subset of content items from a highest ranked content cluster (or the whole content cluster) to provide to a user account as a suggested content collection. Additional detail regarding generating a suggested content collection is provided below with reference to the figures.

As suggested above, the collection seeding system can provide several improvements or advantages over existing digital content systems. For example, some embodiments of the collection seeding system can improve accuracy over prior systems. As opposed to existing systems that rigidly adhere to access patterns for grouping content items, the collection seeding system can generate new content collections using content-based features, such as content-specific topics and object classifications. As a result, the collection seeding system can provide more accurate content collections that reflect commonly themed content items more appropriate for shared collections and that are more adaptive to different types of content items. Indeed, the collection seeding system can generate suggested content collections that are related to shared topics and/or classifications, rather than only related to one another based only on access patterns of user accounts.

In addition to improving accuracy over prior digital content systems, the collection seeding system can also improve efficiency. For example, by generating more accurate content collections, the collection seeding system can mitigate or reduce user interactions required to move content items in and out of various collections, thereby saving processing resources that prior systems waste processing the excessive user interactions. In addition, the collection seeding system can generate suggested content collections in the form of virtual folders that include ghost content items (e.g., links or references to storage locations of content items that nevertheless appear like content items), rather than creating copies of content items for storage in new locations for different collections. The collection seeding system thus saves storage resources that prior systems waste maintaining duplicative content.

As another example, the collection seeding system can provide more efficient user interfaces (e.g., including suggested content collection elements) that reduce the number of user interactions required to access desired data or functionality. Specifically, the collection seeding system provides a suggested content collection element that is selectable to create a new content collection and add a suggested set of content items to the content collection all with a single user interaction. Compared to prior systems that require many user interactions to drill down through nested folders in a hierarchy and/or that require many user interactions to organize content items into respective collections, or that require many user interactions to request a new collection and filter through content items to add to the collection, the collection seeding system intelligently surfaces elements (that require only a single interaction) for adding suggested content collections based on germane topics and/or object classifications. Consequently, the collection seeding system saves computing resources that prior systems expend processing larger numbers of user interactions for accessing or organizing content items.

As illustrated by the foregoing discussion, the present disclosure utilizes a variety of terms to describe features and benefits of the collection seeding system. Additional detail is hereafter provided regarding the meaning of these terms as used in this disclosure. As used herein, the term "digital content item" (or simply "content item") refers to a digital object or a digital file that includes information interpretable by a computing device (e.g., a client device) to present information to a user. A digital content item can include a file such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents. digital images, digital videos, or digital audio files). In some cases, a digital content item can refer to a remotely stored (e.g., cloud-based) item or a link (e.g., a link to a cloud-based item or a web-based content item) and/or a content clip that indicates (or links) a discrete selection or segmented sub-portion of content from a webpage or some other content item or source. A digital content item can be editable or otherwise modifiable and can also be sharable from one user account (or client device) to another. In some cases, a digital content item is modifiable by multiple user accounts (or client devices) simultaneously and/or at different times.

Relatedly, the term "seed content item" refers to a content item that is used to seed generating of a new, suggested content collection. For example, a seed content item includes a content item selected from among a plurality of content items as particularly relevant or pertinent to a user account to use as a basis for instigating identification of additional content items related to the seed content item for inclusion in a suggested content collection. Indeed, the collection seeding system can determine a topic or object classification from a seed content item that is germane to a user account within a content management system.

Additionally, the term "content collection" refers to a collection or grouping of content items. For example, a content collection includes content items stored in one or more locations on a device or cloud-based network servers. In some cases, a content collection includes content items arranged together or otherwise associated with one another while stored in different locations. For instance, a content collection can refer to a grouping of content items associated with a user account of a content management system and/or that share certain attributes such as access patterns, topics, or classifications. In some embodiments, a content collection can include additional content collections therein, each containing different content items.

Relatedly, the term "suggested content collection" refers to a content collection seeded by a seed content item. For example, a suggested content collection can include a content collection that is generated or grouped by the collection seeding system to suggest to a user account. In some cases, a suggested content collection includes content items selected from a content cluster that is clustered based on a topic and/or object classification of a seed content item.

As mentioned, in some cases, the collection seeding system generates content clusters in relation to a seed content item. As used herein, the term "content cluster" refers to a cluster or grouping of content items that share one or more content-based attributes. For example, a content cluster can refer to a grouping of content items that includes content items reflecting (or otherwise corresponding to) a common topic (at least to some measure or degree) and/or depicting a commonly classified object.

As used herein, the term "germane topic" refers to a topic determined to be relevant to a user account. For example, a germane topic includes a topic selected, determined, or identified as relevant, pertinent, or material to a user account based on user account behavior. In some cases, a germane topic includes a topic or subject matter that is determined using a machine learning model, such as a topic prediction machine learning model.

As mentioned above, the collection seeding system can select seed content items and generate content clusters using one or more machine learning models. As used herein, the term "machine learning model" refers to a computer algorithm or a collection of computer algorithms that automatically improve for a particular task through iterative outputs or predictions based on use of data. For example, a machine learning model can utilize one or more learning techniques to improve in accuracy and/or effectiveness. Example machine learning models include various types of neural networks, decision trees, support vector machines, linear regression models, and Bayesian networks. As described in further detail below, the collection seeding system utilizes a "seed prediction machine learning model" that can include, for example, one or more neural networks, to select or predict content items that a user account will access to use as seed content items. In addition, the collection seeding system utilizes a "topic prediction machine learning model" such as a neural network to generate or predict a topic from a content item. In some cases, the collection seeding system utilizes an "object classification machine learning model" to determine image and/or object classifications for content items. Further, the collection seeding system utilizes a "hybrid relevance machine learning model" to determine or predict hybrid relevance scores for content items based on a combination of topics and/or object classifications for one or more content items (or based on scores determined by different models associated with topics and/or classifications).

Relatedly, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., generated recommendation scores) based on a plurality of inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a recurrent neural network (e.g., an LSTM), a graph neural network, or a generative adversarial neural network. Upon training as described below, such a neural network may become a content attribute neural network or a dynamic facet neural network.

As used herein, the term "application session" (or sometimes simply "session") refers to an instance of use within a client application or within a particular collection or folder or content item using a client application. For example, an application session refers a set of activities performed within a single login of a client application or an application of a content management system. As another example, an application session refers to a set of activities performed within a single visit of an application or a single access of a content collection or folder. In some cases, a session requires a login while in other cases, a session does not require a login and instead indicates an instance of use between closures or terminations (of an application or webpage) or between visits that are at least a threshold period of time apart (or separated by a device power off or sleep mode).

Additional detail regarding the collection seeding system will now be provided with reference to the figures. For example, FIG. 1 illustrates a schematic diagram of an example system environment for implementing a collection seeding system 102 in accordance with one or more implementations. An overview of the collection seeding system 102 is described in relation to FIG. 1. Thereafter, a more detailed description of the components and processes of the collection seeding system 102 is provided in relation to the subsequent figures.

As shown, the environment includes server(s) 104, a client device 108, a database 114, and a network 112. Each of the components of the environment can communicate via the network 112, and the network 112 may be any suitable network over which computing devices can communicate. Example networks are discussed in more detail below in relation to FIGS. 10-11.

As mentioned above, the example environment includes a client device 108. The client device 108 can be one of a variety of computing devices, including a smartphone, a tablet, a smart television, a desktop computer, a laptop computer, a virtual reality device, an augmented reality device, or another computing device as described in relation to FIGS. 10-11. The client device 108 can communicate with the server(s) 104 and/or the database 114 via the network 112. For example, the client device 108 can receive user input from a user interacting with the client device 108 (e.g., via the client application 110) to, for instance, access, generate, modify, or share a content item, to collaborate with a co-user of a different client device, or to select a user interface element to accept a suggested content collection. In addition, the collection seeding system 102 on the server(s) 104 can receive information relating to various interactions with content items and/or user interface elements based on the input received by the client device 108 (e.g., to access content items, generate content collections, or perform some other action).

As shown, the client device 108 can include a client application 110. In particular, the client application 110 may be a web application, a native application installed on the client device 108 (e.g., a mobile application, a desktop application, etc.), or a cloud-based application where all or part of the functionality is performed by the server(s) 104. Based on instructions from the client application 110, the client device 108 can present or display information, including a user interface that includes suggested content collection element for adding a suggested content collection to a user account of the content management system 106.

As illustrated in FIG. 1, the example environment also includes the server(s) 104. The server(s) 104 may generate, track, store, process, receive, and transmit electronic data, such as digital content items, account activity, interface elements, interactions with digital content items, and/or interactions between user accounts or client devices. For example, the server(s) 104 may receive data from the client device 108 in the form of a selection of a particular content item relating to a certain topic. In addition, the server(s) 104 can transmit data to the client device 108 in the form of a content item, a suggested content collection seeded by the selected content item (or some other content item relating to a common topic), or some other information. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the collection seeding system 102 as part of a content management system 106. The content management system 106 can communicate with the client device 108 to perform various functions associated with the client application 110 such as managing user accounts, managing content collections, managing content items, and facilitating user interaction with the content collections and/or content items. Indeed, the content management system 106 can include a network-based smart cloud storage system to manage, store, and maintain content items and related data across numerous user accounts. In some embodiments, the collection seeding system 102 and/or the content management system 106 utilize the database 114 to store and access information such as digital content items, content attributes, content collections, and other information.

Although FIG. 1 depicts the collection seeding system 102 located on the server(s) 104, in some implementations, the collection seeding system 102 may be implemented by (e.g., located entirely or in part) on one or more other components of the environment. For example, the collection seeding system 102 may be implemented by the client device 108, and/or a third-party device. For example, the client device 108 can download all or part of the collection seeding system 102 for implementation independent of, or together with, the server(s) 104.

In some implementations, though not illustrated in FIG. 1, the environment may have a different arrangement of components and/or may have a different number or set of components altogether. For example, the client device 108 may communicate directly with the collection seeding system 102, bypassing the network 112. As another example, the environment may include multiple client devices, each associated with a different user account for managing digital content items. In addition, the environment can include the database 114 located external to the server(s) 104 (e.g., in communication via the network 112) or located on the server(s) 104 and/or on the client device 108.

Figure 2:
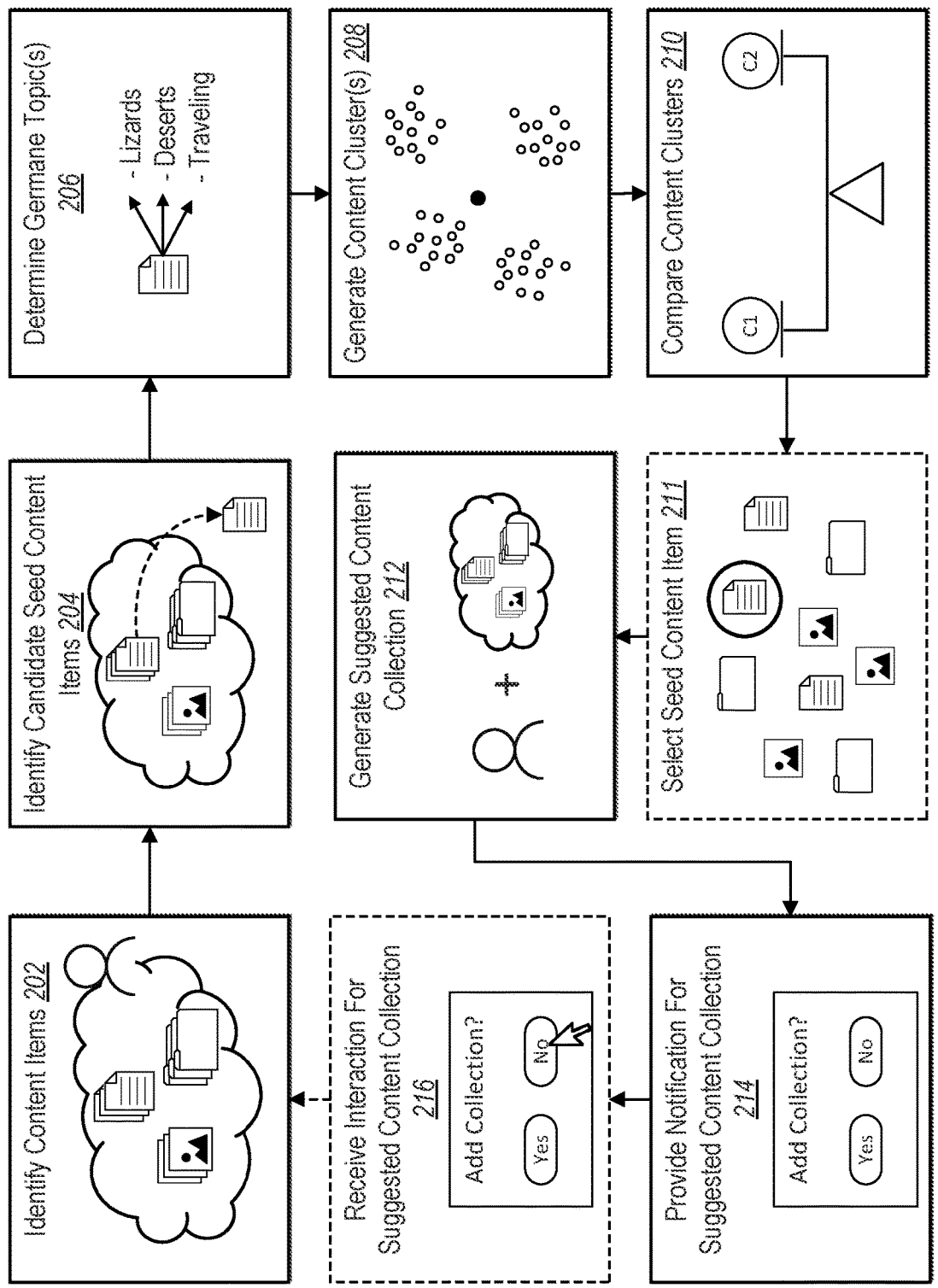
FIG. 2 illustrates an example overview of generating and providing a suggested content collection in accordance with one or more embodiments.

As mentioned above, the collection seeding system 102 can generate and provide a suggested content collection to a user account of the content management system 106. In particular, the collection seeding system 102 can select a seed content item for seeding generation of a suggested content collection to provide to a user account. FIG. 2 illustrates an overview of generating and providing a suggested content collection based on a seed content item in accordance with one or more embodiments. Additional detail regarding the various acts of FIG. 2 is provided thereafter with reference to subsequent figures.

As illustrated in FIG. 2, the collection seeding system 102 performs an act 202 to identify content items. To elaborate, the collection seeding system 102 identifies a plurality of content items stored within the database 114 or at the client device 108 or at some other network location (e.g., on the server(s) 104 or elsewhere). For example, the collection seeding system 102 identifies content items associated with a particular user account within the content management system 106. The content items can belong to various content collections or can be independent of any collections, stored across various network locations of the content management system 106.

As further illustrated in FIG. 2, the collection seeding system 102 performs an act 204 to identify candidate seed content items. In particular, the collection seeding system 102 identifies a candidate seed content item by identifying a content item from among the plurality of content items (e.g., as identified via the act 202) that would be effective for seeding a new content collection. For example, the collection seeding system 102 determines relevance scores for the identified content items in relation to the user account to determine which content items are more relevant than others. As described in further detail below, the collection seeding system 102 can determine relevance scores based on access patterns and other account activity that indicates interactions of the user account with the various content items, in addition to content-specific attributes of the content items such as mentions of topics relevant to the user account. The collection seeding system 102 further identifies a candidate seed content item that satisfies a relevance threshold. In some cases, the collection seeding system 102 utilizes a seed prediction machine learning model to identify a candidate seed content item as a content item predicted to be accessed by the user account (e.g., within a specific application session or timeframe).

In some cases, the act 204 is for selecting a seed content item (without identifying candidate seed content items). In particular, the collection seeding system 102 selects a seed content item by identifying a content item from among the plurality of content items (e.g., as identified via the act 202) that would be effective for seeding a new content collection. For example, the collection seeding system 102 determines relevance scores for the identified content items in relation to the user account to determine which content items are more relevant than others. As described in further detail below, the collection seeding system 102 can determine relevance scores based on access patterns and other account activity that indicates interactions of the user account with the various content items, in addition to content-specific attributes of the content items such as mentions of topics relevant to the user account. The collection seeding system 102 further selects a seed content item that is most relevant to the user account and/or that satisfies a relevance threshold. In some cases, the collection seeding system 102 utilizes a seed prediction machine learning model to select a seed content item as a content item predicted to be accessed by the user account (e.g., within a specific application session or timeframe).

Additionally, the collection seeding system 102 performs an act 206 to determine one or more germane topics associated with a (candidate) seed content item. More specifically, the collection seeding system 102 determines a germane topic by extracting topics from the (candidate) seed content item and determining which of the extracted topics are germane (or relevant) to the user account. For instance, the collection seeding system 102 analyzes a seed content item using a model, such as a topic prediction machine learning model, to predict, extract, or determine various topics mentioned or reflected by the (candidate) seed content item.

Because the (candidate) seed content item has already been determined to be germane to the user account, in some embodiments, the collection seeding system 102 can thus determine that the extracted topics are germane topics. In some cases, however, the collection seeding system 102 further determines relevance scores for the extracted topics in relation to the user account and selects one or more topics that are most relevant as germane topics. For instance, the collection seeding system 102 compares the relevance scores and selects one or more most relevant topics or selects content topics that satisfy a relevance threshold as germane topics. As shown, the collection seeding system 102 determines germane topics, including "Lizards," "Deserts," and "Traveling" from the seed content item in the form of a digital document.

In some cases, the collection seeding system 102 determines object classifications (or image classifications) for the (candidate) seed content item in addition (or alternatively) to determining germane topic(s). For example, the collection seeding system 102 utilizes one or more models, such as object classification models, to analyze digital images to detect depicted objects and to further classify the depicted objects into object classifications reflecting character expressions of the depicted objects (e.g., "person," "tree," or "car"). In certain embodiments, the collection seeding system 102 utilizes an image classification model to determine a classification for a content item as a whole, such as "skyline" or "cityscape" to describe the contents depicted in the content item without necessarily distinguishing between (or identifying) individual objects. In some cases, the collection seeding system 102 utilizes object classification machine learning models capable of distinguishing between different instances of commonly categorized objects, such as a first person and a second person depicted within a digital image. Additionally, the collection seeding system 102 can determine relevance scores for the object/image classifications in relation to the user account and can select one more classifications that satisfy a relevance threshold as germane classifications.

As further illustrated in FIG. 2, the collection seeding system 102 performs an act 208 to generate one or more content clusters. More particularly, the collection seeding system 102 generates clusters of content items based on the germane topic(s) and/or object classification(s) extracted from a (candidate) seed content item. For example, the collection seeding system 102 analyzes additional content items (associated with the same user account or otherwise) within the content management system 106 to determine topics and/or object classifications of the additional content items. In some cases, the collection seeding system 102 determines multiple topics and/or object classifications for a single content item, where one topic is more emphasized than another. Indeed, the collection seeding system 102 can rank topics/classifications for each content item. The collection seeding system 102 can further cluster the content items according to most prevalent (e.g., representative) topics and/or according to weighted combinations of multiple topics together.

For example, the collection seeding system 102 can compare the topics and/or classifications of the additional content items with each other. For instance, the collection seeding system 102 can cluster content items by topic (e.g., into topic-specific content clusters) according to the one or more topics reflected by the various content items. In some embodiments, the collection seeding system 102 utilizes a topic prediction machine learning model to extract feature vectors from content items to compare within a latent feature space. The collection seeding system 102 can further cluster content items according to distances of the feature vectors from one another within the latent space (e.g., according to a clustering algorithm).

As further illustrated in FIG. 2, the collection seeding system 102 can perform an act 210 to compare content clusters. To elaborate, the collection seeding system 102 compares content clusters with one another based on their respective relevance or closeness to a germane topic and/or a germane classification. For example, the collection seeding system 102 determines a cluster center for each content cluster (e.g., a representative topic closest to the center of the cluster or classification or a composite topic/classification of a combination of clustered topics/classifications). The collection seeding system 102 can further compare the cluster center with the germane topic (e.g., to determine a distance in feature space). In some cases, the collection seeding system 102 need not determine a cluster center and instead determines distances for averages (or some other combination) of feature vectors of content clusters from the feature vector of the germane topic (or classification).

As shown, in some embodiments, the collection seeding system 102 can perform an act 211 to select a seed content item. For example, the collection seeding system 102 selects a seed content item based on the comparison of act 210. In particular, the collection seeding system 102 selects a seed content item that results in a content cluster that has a highest relevance score in relation to a user account. Indeed, in act 210 the collection seeding system compares content clusters across many candidate seed content items, and in act 211 the collection seeding system selects a seed content item that seeds a most relevant content cluster.

Additionally, the collection seeding system 102 performs an act 212 to generate a suggested content collection. In particular, the collection seeding system 102 determines a suggested content collection based on the comparison of act 210 and/or the selected seed content item of act 211. For instance, the collection seeding system 102 identifies a content cluster from among the content clusters to use as a suggested content collection (or from which to select content items for a suggested content collection). In some cases, the collection seeding system 102 determines that a content cluster with a highest measure of relevance or a closest relationship with the germane topic (or classification) is a suggested content collection. For example, the collection seeding system 102 determines that a content cluster closest to the germane topic within the feature space is the suggested content collection. In some embodiments, the collection seeding system 102 selects a subset of content items from a content cluster to use as a suggested content collection (e.g., a set of content items with highest relevance scores in relation to the user account, or with closest relationships to the germane topic, or a combination thereof).

As further illustrated in FIG. 2, the collection seeding system 102 performs an act 214 to provide a notification for the suggested content collection. In particular, the collection seeding system 102 generates and provides a notification for display on a client device of the user account. The notification can include an indication of a suggested content collection along with a selectable option to accept the suggested content collection. Indeed, the notification can facilitate single-click generation and addition of a new content collection for the user account within the content management system 106.

Indeed, as shown, the collection seeding system 102 can perform an act 216 to receive an interaction for the suggested content collection. For example, collection seeding system 102 receives an interaction to accept the suggested content collection, whereupon the collection seeding system 102 generates and adds the suggested content collection for the user account. Specifically, the collection seeding system 102 generates a virtual folder that includes ghost content items (or phantom content items or quasi content items or pseudo content items) that link or reference actual storage locations of respective content items and that appear like full-fledged content items (e.g., with corresponding icons and metadata) but that do not actually include the content data of the corresponding content items. In certain embodiments, the collection seeding system 102 further modifies subsequent seeding for additional suggested content collections based on the acceptance of the suggested content collection (e.g., to generate additional content collections similar in topic to the accepted content collection).

In some cases, collection seeding system 102 receives an interaction declining a suggested content collection. Based on the rejection, the collection seeding system 102 does not create a virtual folder and does not add a new content collection for the user account. Additionally, the collection seeding system 102 modifies subsequent seeding and generation of additional suggested content items based on the rejection. For example, the collection seeding system 102 generates a thematically different suggested content collection where the topic varies from that of the previously rejected content collection.

Figure 3:
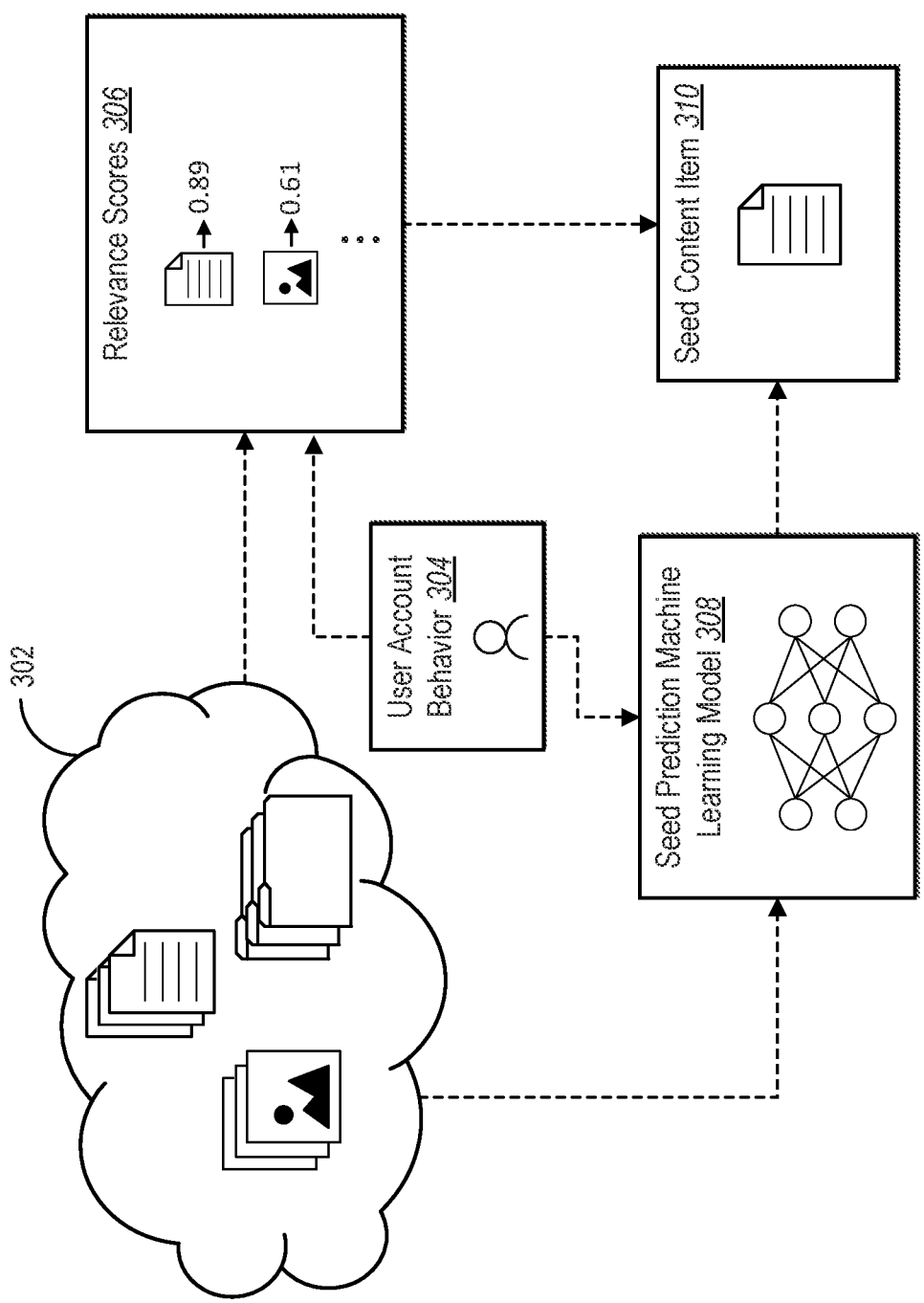
FIG. 3 illustrates an example diagram for selecting a seed content item in accordance with one or more embodiments.

As mentioned, in certain described embodiments, the collection seeding system 102 determines or selects seed content items. In particular, the collection seeding system 102 selects a seed content item for seeding generation of a suggested content collection. In some cases, the collection seeding system 102 determines candidate seed content items from which to ultimately select a seed content item. FIG. 3 illustrates an example diagram for selecting a seed content item or identifying a candidate seed content item in accordance with one or more embodiments.

As illustrated in FIG. 3, the collection seeding system 102 accesses a repository 302 of content items associated with a user account of the content management system 106. For example, the collection seeding system 102 identifies content items within folders, collections, collaborative projects, and other locations associated with the user account within the content management system 106. In addition, the content management system 102 determines relevance scores 306 for the content items in the repository 302. For instance, the collection seeding system 102 determines the relevance scores 306 based on user account behavior 304 associated with the user account.

Specifically, the collection seeding system 102 determines the user account behavior 304 from historical account activity such as selections, copies, pastes, moves, deletions, views, shares, comments, or other interactions with content items. Indeed, the collection seeding system 102 can track or monitor account activity over time and/or over different application sessions. The collection seeding system 102 can further utilize a relevance model to generate the relevance scores 306 based on the user account behavior 304. For example, the collection seeding system 102 compares account activity of different content items to determine the relevance scores 306. In some cases, the collection seeding system 102 weights different interactions (e.g., selections, copies, pastes, moves, deletions, views, shares, or comments) differently in the relevance determination. In these or other cases, the collection seeding system 102 weights interactions based on recency, frequency, time of day, or other timing considerations. Thus, the collection seeding system 102 can determine the relevance scores 306 based on a weighted combination of account activities from the user account behavior 304.

In some cases, the collection seeding system 102 ranks content items based on relevance to the user account. For example, the collection seeding system 102 compares relevance scores and determines a ranking of the content items based on the comparison. As shown, the collection seeding system 102 determines a highest relevance score for a digital document. In some cases, the collection seeding system 102 further selects the content item with the highest relevance score as the seed content item 310. In these or other cases, the collection seeding system 102 updates relevance scores (and corresponding rankings) over time as the user account behavior 304 changes and the user account interacts with different content items. In some embodiments, the seed content item 310 refers to a candidate seed content item.

As part of determining the relevance scores 306, in some embodiments, the collection seeding system 102 filters out some content items from the repository 302. That is, the collection seeding system 102 identifies content items that are ineligible as seed content items and removes those content items from consideration (e.g., does not determine relevance scores for those content items). For example, the collection seeding system 102 identifies and avoids archival content items associated with the user account. Indeed, in some cases, archival content items include or reflect content that is primarily meant for record-keeping purposes (personal or otherwise). Such archival content items can include financial records, contact lists, recipes, and medical documents and are not good candidates for seeding content collections because they would seed generation of collections including similarly uninteresting content items.

In some cases, the collection seeding system 102 identifies content items that contain or reflect personal or sensitive information as ineligible for use as seed content items. In these or other cases, the collection seeding system 102 excludes from consideration as seeds those content items that exceed a threshold age (or duration of time) stored within the content management system 106 and/or a threshold duration of time since previously accessed. Thus, the collection seeding system 102 can avoid generating suggested content collections that include additional content items containing sensitive information, old content items, and/or archival content items.

As also illustrated in FIG. 3, in some embodiments, the collection seeding system 102 can utilize a seed prediction machine learning model 308 to select the seed content item 310 (or a candidate seed content item). In particular, the collection seeding system 102 can utilize the seed prediction machine learning model 308 to predict, as the seed content item 310, a content item that the user account is most likely to access from among the content items within the repository 302. In some cases, the collection seeding system 102 utilizes the seed prediction machine learning model 308 to select a content item that satisfies a threshold access probability as the seed content item 310. For example, the collection seeding system 102 utilizes the seed prediction machine learning model 308 to determine and compare access probabilities for content items from the repository 302.

To determine the access probabilities, the collection seeding system 102 utilizes the user account behavior 304. For example, the collection seeding system 102 inputs the user account behavior 304 into the seed prediction machine learning model 308 which is trained to generate or predict access probabilities for individual content items based on sample account behavior. Thus, using the user account behavior 304 as input (as described above), the seed prediction machine learning model 308 generates access probability predictions for the content items of the repository 302. In some cases, the collection seeding system 102 (using the seed prediction machine learning model 308 or otherwise) compares the access probabilities with one another and/or with a threshold probability to select the seed content item 310 as a content item with a highest access probability and/or that satisfies a threshold access probability.

Figure 4:
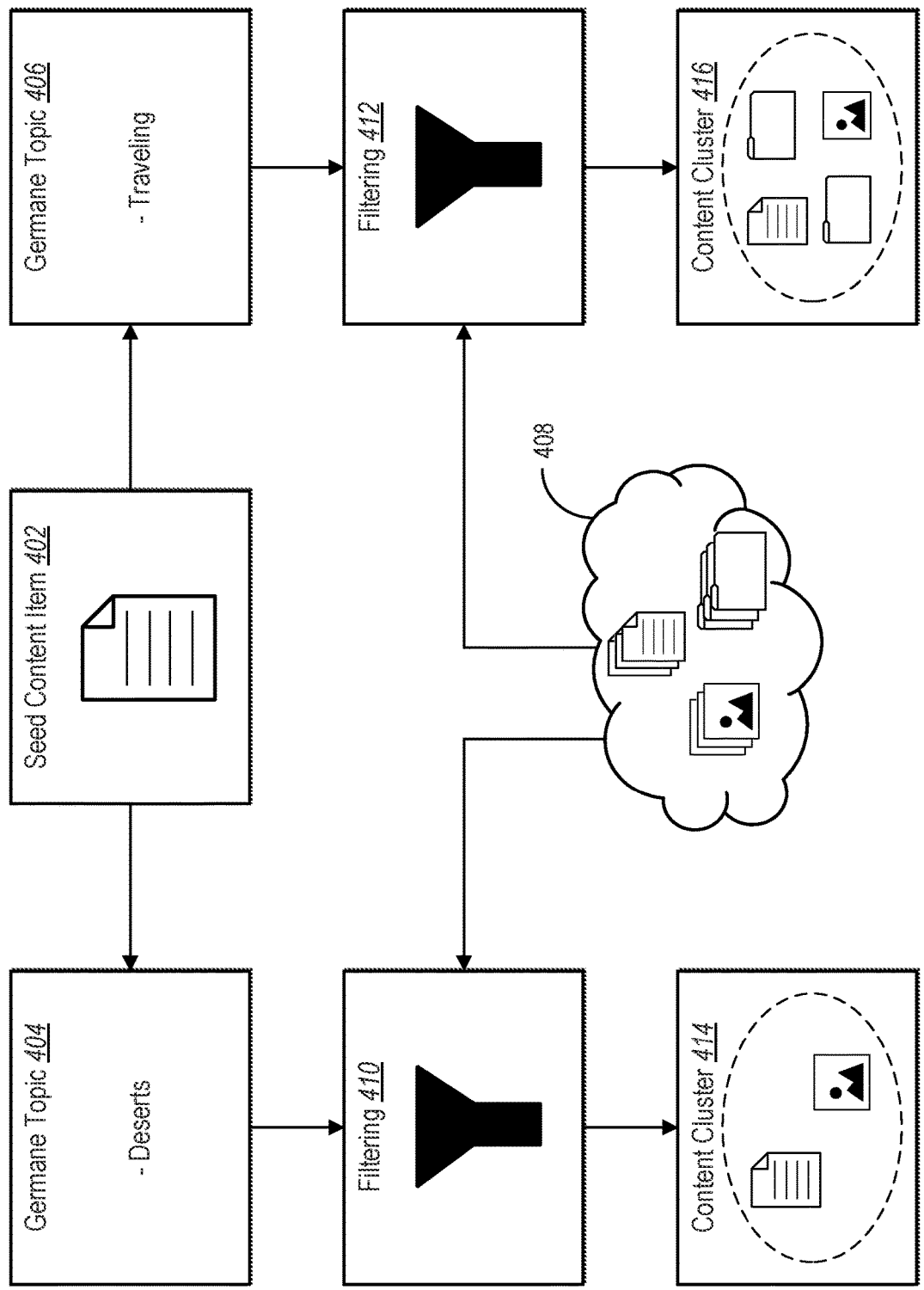
FIG. 4 illustrates an example diagram for generating content clusters from a seed content item in accordance with one or more embodiments.

As mentioned above, in certain embodiments, the collection seeding system 102 generates content clusters based on a seed content item. In particular, the collection seeding system 102 determines or extracts one or more germane topics from a seed content item and clusters content items according to the germane topic(s). FIG. 4 illustrates an example diagram of generating content clusters from a seed content item in accordance with one or more embodiments.

As illustrated in FIG. 4, the collection seeding system 102 can determine multiple germane topics from a single seed content item 402. In some cases, the seed content item 402 refers to a candidate seed content item. As shown, the collection seeding system 102 determines a germane topic 404 ("Deserts") and a germane topic 406 ("Traveling") from the seed content item 402. The collection seeding system 102 can further utilize the germane topic 404 and the germane topic 406 to generate respective content clusters. In some cases, the collection seeding system 102 generates multiple content clusters for each of the germane topics 404 and 406.

To determine the germane topic 404 and/or the germane topic 406, the collection seeding system 102 can utilize a topic prediction machine learning model. More specifically, the collection seeding system 102 can utilize a topic prediction machine learning model to analyze the seed content item 402 and to generate topic predictions from the seed content item. For example, the topic prediction machine learning model (or some other topic determination model) analyzes text, video, audio, and/or image data of the seed content item to predict topics reflected by the seed content item 402. In some embodiments, the topic prediction machine learning model determines or generates probabilities associated with a plurality of topics, where the probabilities indicate how likely (or to what degree) the seed content item 402 reflects the corresponding topics (e.g., if the topic is only incidentally mentioned or more heavily emphasized within the seed content item 402). In some cases, the collection seeding system 102 selects the germane topic 404 and the germane topic 406 as most likely topics from the plurality of topics (or as topics that satisfy a topic probability threshold).

In some embodiments, the collection seeding system 102 can also (or alternatively) determine object classifications (or image classifications) from the seed content item 402. Indeed, even though FIG. 4 depicts the germane topic 404 and the germane topic 406, the collection seeding system 102 can also or alternatively extract object classifications from the seed content item 402. For instance, the collection seeding system 102 utilizes an object classification machine learning model to analyze the seed content item 402 to determine or predict objects depicted within the seed content item (e.g., as part of a digital video, a digital image, a digital document, or some other content item). Specifically, the collection seeding system 102 utilizes the object classification machine learning model to analyze pixels of the seed content item 402 to generate or predict object boundaries or segmentations for various depicted objects. The object classification machine learning model further generates predictions of object classifications (e.g., character strings indicating names or labels for the various object boundaries/segments), including probabilities for the various predictions. In some cases, the collection seeding system 102 selects one or more object classifications for the seed content item 402 to use as the germane topic 404 and/or the germane topic 406, such as object classifications with the highest probability and/or for objects that are most prominent (e.g., whose boundaries cover the largest areas of an image and/or occupy the most frames of a video).

In certain embodiments, the collection seeding system 102 utilizes an image classification model to classify an entire image (rather than individual objects). For example, the collection seeding system 102 utilizes an image classification machine learning model to analyze the seed content item 402 to generate predictions for various image classifications. In some cases, the collection seeding system 102 generates image classifications as labels that describe the pixels of the seed content item 402 as a whole (e.g., "landscape," "mountains," "kitchen," "shopping mall," or some other image-level descriptor). The collection seeding system 102 can further select the highest probability image classifications (or image classifications that satisfy an image classification probability threshold) as the germane topic 404 and the germane topic 406.

Based on the germane topic 404 and the germane topic 406, the collection seeding system 102 can perform filtering 410 and filtering 412, respectively. To elaborate, the collection seeding system 102 filters content items from the repository 408 associated with the user account within the content management system 106. For example, the collection seeding system 102 performs the filtering 410 to generate a filtered subset of content items from which to generate the content cluster 414 corresponding to the germane topic 404. As another example, the collection seeding system 102 performs the filtering 412 to generate a filtered subset of content items from which to generate the content cluster 416 corresponding to the germane topic 406.

More specifically, the collection seeding system 102 performs the filtering 410 and the filtering 412 by removing or excluding certain content items from consideration for including within content clusters. For instance, the collection seeding system 102 identifies and excludes archival content items (e.g., content items meant for record keeping and not likely useful in a collection for creating or sharing), personal or sensitive content items, and/or content items that exceed an age threshold. Indeed, to avoid generating suggested content collections that include uninteresting content items, personal/sensitive content items, and/or old content items that are unlikely to be useful to a user account, the collection seeding system 102 filters out these content items from inclusion within content clusters. Additional detail regarding archival content items, personal content items, and old content items is provided above in relation to selecting seed content items.

From the filtered subset of content items, the collection seeding system 102 further generates content clusters corresponding to the germane topic 404 and the germane topic 406. In particular, as part of clustering content items, the collection seeding system 102 determines relevance scores between content items from the repository 408 (those not filtered out) and the germane topic 404 or the germane topic 406. In some cases, the collection seeding system 102 utilizes a clustering model (e.g., a clustering machine learning model) to cluster content items according to relevance to the germane topic 404 and the germane topic 406. For example, the collection seeding system 102 compares the topics of the unfiltered content items with the germane topic 404 and/or the germane topic 406 to determine relevance scores. The collection seeding system 102 further ranks the content items according to the relevance scores and selects a threshold number (e.g., five, ten, or fourteen) of highest ranked content items (or those that satisfy a relevance threshold) to include within the content cluster 414 and the content cluster 416.

In some embodiments, the collection seeding system 102 determines topics for the filtered subset of content items and compares the topics with one another to generate content clusters. In some cases, the collection seeding system 102 generates and clusters topic vectors for the topics of content items (e.g., by clustering according to relative distances in feature space), including the germane topic 404 and the germane topic 406. The collection seeding system 102 further compares the content clusters with the germane topic 404 and the germane topic 406 (e.g., by comparing a cluster center or an average topic). For instance, the collection seeding system 102 determines distances between the clusters and the feature vector of the germane topic 404 and the germane topic 406 in feature space. The collection seeding system 102 can further select a cluster closest to the vector of the germane topic 404 as the content cluster 414 and can select a cluster closest to the vector of the germane topic 406 as the content cluster 416.

In certain embodiments, the collection seeding system 102 can consider access patterns as part of generating the content clusters 414 and 416. More specifically, the collection seeding system 102 monitors access patters of content items within the repository 408 to determine or identify co-access patterns. In some cases, the collection seeding system 102 determines a co-access pattern where two or more content items are accessed within a common application session or where two or more content items are accessed within a threshold time period. The collection seeding system 102 can determine co-access patterns based on activity of the user account as well as collaborative user accounts within various groups or teams of the user account. For instance, in some embodiments, the collection seeding system determines a co-access pattern for two content items where one content item is accessed by the user account and the other content item is accessed by a collaborative user account. In certain cases, the collection seeding system 102 can generate co-access pattern scores based on weighted combinations of accesses, where accesses by collaborative user accounts are weighted less heavily than accesses by the user account, and/or where access weights deteriorate or decay over time (e.g., so that more recent co-access have stronger weights).

As part of determine relevance scores for, or comparing, content items from repository 408, the collection seeding system 102 can utilize a mixed measurement to compare topics, classifications, co-access patterns, and/or other factors. Particularly, the collection seeding system 102 generates hybrid relevance scores for content items to facilitate comparing across different metrics such as topics and classifications (and co-access patterns). Indeed, the collection seeding system 102 not only compares topics, but the collection seeding system 102 further compares object classifications (or image classifications) of content items to generate content clusters and/or to compare the content clusters with the germane topic 404 and the germane topic 406. In some cases, the collection seeding system 102 generates a hybrid relevance score that includes or incorporates object/image classification relevance together with topic relevance. For instance, the collection seeding system 102 normalizes across topic relevance scores and object classification relevance scores to generate hybrid relevance scores that consider both factors (and/or others such as audio relevance, search result relevance). Thus, the collection seeding system 102 generates a hybrid relevance score by combining a topic relevance score and an object classification relevance score (and/or additional relevance scores such as a co-access relevance score).

In one or more embodiments, the collection seeding system 102 utilizes a hybrid relevance machine learning model (or some other hybrid relevance model) to generate hybrid relevance scores. For example, the hybrid relevance machine learning model takes a topic relevance score, an object classification relevance score, and/or other relevance scores as input, whereupon the hybrid relevance machine learning model generates an output in the form of a hybrid relevance score that reflects a relevance of a content item with respect to a germane topic (or another content item). The collection seeding system 102 can further rank content items according to hybrid relevance scores and can select a threshold number of highest ranked content items (or those that satisfy a threshold hybrid relevance threshold) to include within the content cluster 414 and the content cluster 416.

In some cases, the hybrid relevance machine learning model extracts or generates hybrid feature vectors from content items and/or from the germane topics 404 and 406. The hybrid relevance machine learning model further determines distances between hybrid feature vectors within a feature space to cluster content items. For example, the collection seeding system 102 clusters hybrid feature vectors based on relative distances to one another. The collection seeding system 102 can further select content clusters within a threshold distance of a hybrid feature vector of the seed content item 402 as the content cluster 414 and the content cluster 416. Thus, the collection seeding system 102 can generate the content cluster 414 and the content cluster 416 based on hybrid relevance scores.

Figure 5:
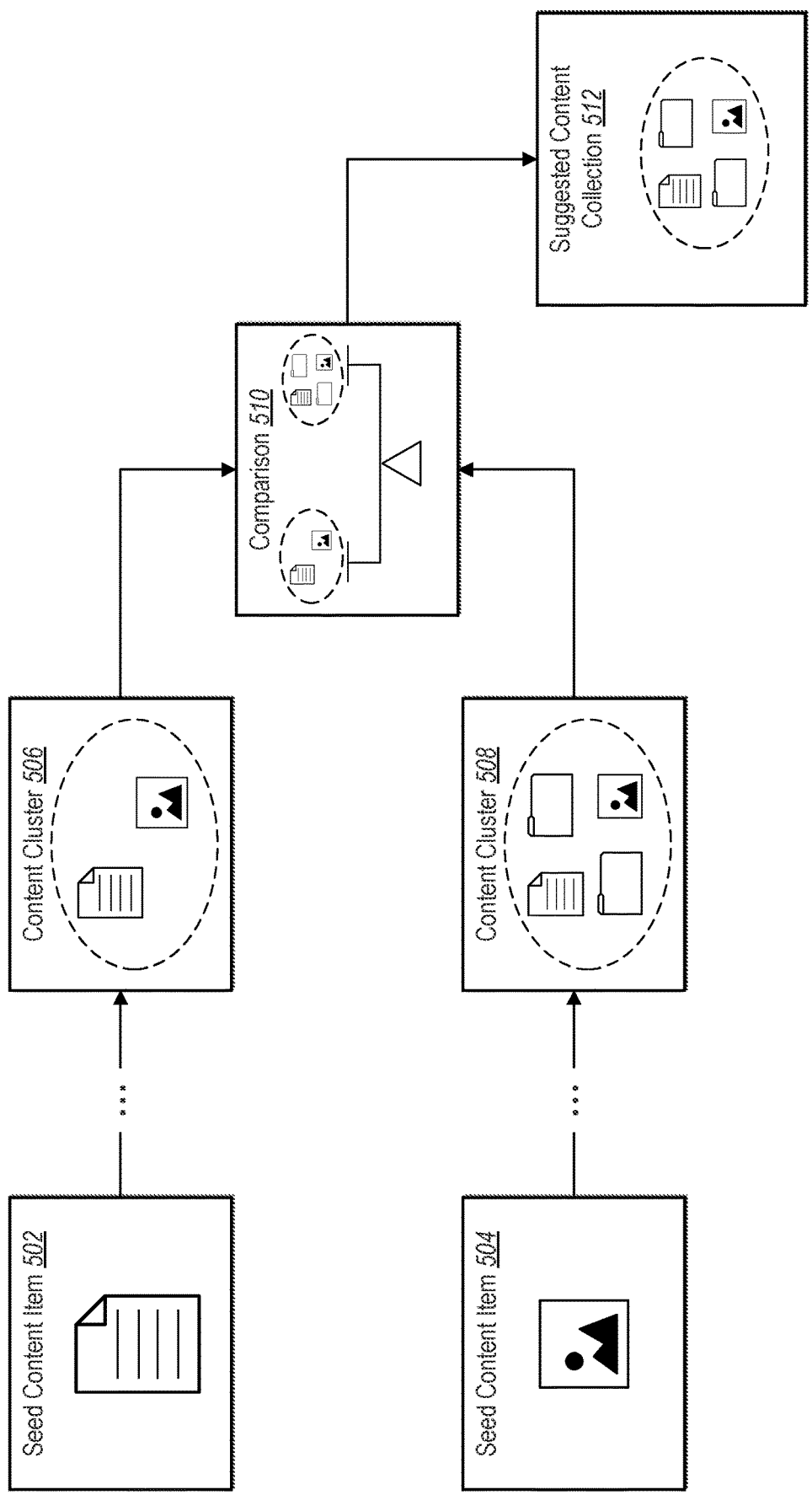
FIG. 5 illustrates an example diagram for generating a suggested content collection from content clusters in accordance with one or more embodiments.

As mentioned above, in certain described embodiments, the collection seeding system 102 generates a suggested content collection from one or more content clusters (e.g., the content cluster 414 and/or the content cluster 416). In particular, the collection seeding system 102 identifies a content cluster from which to generate a suggested content collection for a user account of the content management system 106. FIG. 5 illustrates an example diagram of generating a suggested content collection in accordance with one or more embodiments.

As illustrated in FIG. 5, the collection seeding system 102 identifies or selects a seed content item 502 and a seed content item 504. In some cases, the seed content item 502 and the seed content item 504 refer to candidate seed content items. From the seed content item 502, the collection seeding system 102 generates a content cluster 506 based on a germane topic/classification according to the description herein. Similarly, from the seed content item 504, the collection seeding system 102 generates a content cluster 508 based on a germane topic/classification according to this description. As further shown, the collection seeding system 102 performs a comparison 510 to compare the content cluster 506 and the content cluster 508.

More specifically, the collection seeding system 102 compares the content clusters 506 and 508 by determining cluster relevance scores for the content clusters 506 and 508 in relation to the user account. For example, the collection seeding system 102 determines the cluster relevance scores based on user account behavior indicating account activities in relation to content items within the content clusters 506 and 508. In some cases, the collection seeding system 102 determines the cluster relevance scores by combining (e.g., summing or averaging or weighted averaging) the relevance scores of individual content items within the content clusters 506 and 508. Additional detail regarding determining relevance scores for content items is provided above in relation to selecting seed content items.

The collection seeding system 102 can further compare the cluster relevance scores for the content cluster 506 and the content cluster 508 and can select the content cluster with the higher relevance score as the suggested content collection 512. In some cases, the collection seeding system 102 compares more than two content clusters as part of the comparison 510. Thus, the collection seeding system 102 can rank the content clusters according to the cluster relevance scores and can select a highest ranked content cluster as the suggested content collection 512. In some embodiments, the collection seeding system 102 can select a content cluster generated from a seed content item with the closest relevance to the user account as the suggested content collection 512.

In some cases, the collection seeding system 102 determines the cluster relevance scores in relation to a germane topic (and/or a germane object classification) and/or in relation to the user account. For example, the collection seeding system 102 can generate a combined cluster relevance score as a weighted combination of relevance in relation to a germane topic/classification and relevance in relation to the user account. Indeed, as shown, the collection seeding system 102 can generate different content clusters associated with different seed content items (and/or multiple content clusters per seed content item), and the collection seeding system 102 can perform the comparison 510 across the plurality of content clusters.

In one or more embodiments, the collection seeding system 102 further selects a seed content item based on the comparison 510. For instance, the collection seeding system 102 identifies a highest ranked content cluster or a most relevance content cluster and determines, as the seed content item, a candidate seed content item that seeded the highest ranked/most relevant content cluster. Additionally, the collection seeding system 102 generates the suggested content collection 512 from a highest ranked content cluster (or a content cluster with a highest relevance score) associated with the selected seed content item. More specifically, the collection seeding system 102 selects a set of one or more content items from the content cluster to include within the suggested content collection 512. In some cases, the collection seeding system 102 selects content items to include within the suggested content collection 512 by identifying a threshold number of most relevant content items from the selected content cluster.

In some embodiments, the collection seeding system 102 selects the subset of content items to add to an existing content collection rather than to generate a new content collection. For example, the collection seeding system 102 determines topics (e.g., combined or average topics) content collections associated with the user account. The collection seeding system 102 further compares the topics of the existing collections with the topic of a selected content cluster. If the topic of the cluster is within a threshold similarity of an existing collection, the collection seeding system 102 suggests adding the content items to the existing content collection. If not, the collection seeding system 102 suggests a new content collection for the user account.

In some cases, the collection seeding system 102 generates and provides a notification for a suggested shared collection between multiple user accounts. For example, the collection seeding system 102 determines user accounts that collaborate together with a particular team or that have access to common collections within the content management system 106. The collection seeding system 102 further selects a seed content item relevant to both user accounts (by at least a threshold, as described above).

From the seed content item, the collection seeding system 102 generates content clusters including content items accessible by one or both user accounts. Continuing the process described herein, the collection seeding system 102 further selects or identifies a content cluster from which to generate a suggested content collection. For example, the collection seeding system 102 determines relevance scores for content items in relation to a germane topic/classification of the seed content item and selects content items according to the relevance scores. The collection seeding system 102 further ranks clusters and selects a content cluster as a suggested content collection (or from which to select content items to include within a suggested content collection).

Figure 6:
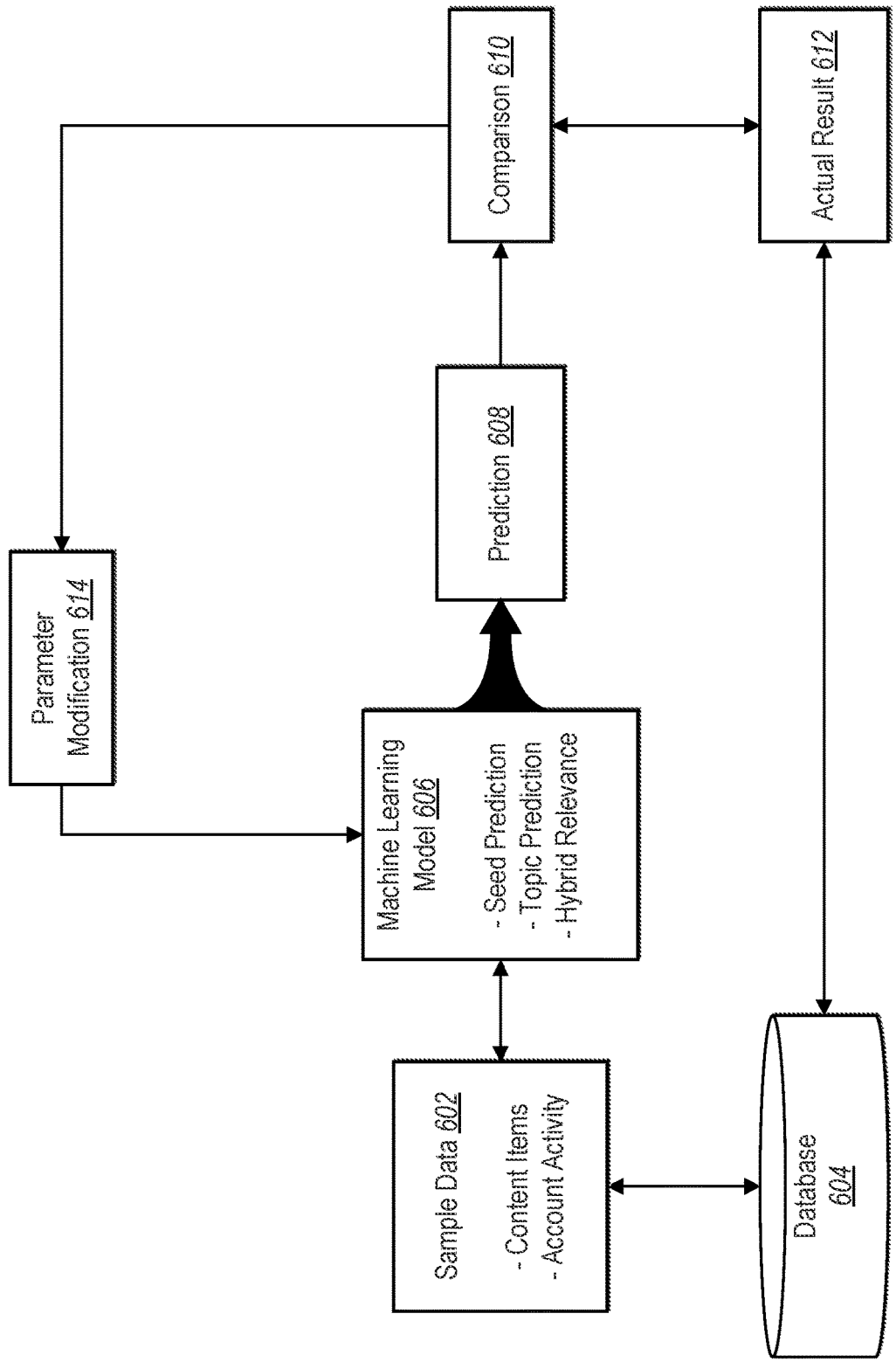
FIG. 6 illustrates an example diagram for training a machine learning model in accordance with one or more embodiments.

In certain described embodiments, the collection seeding system 102 trains a machine learning model to perform one or more tasks. In particular, the collection seeding system 102 trains a machine learning model to generate one or more predictions as described herein. FIG. 6 illustrates an example sequence diagram for training a machine learning model (e.g., a seed prediction machine learning mode, a topic prediction machine learning model, a hybrid relevance machine learning model, an object classification machine learning model, or some other machine learning model described herein) in accordance with one or more embodiments. In some cases, the collection seeding system 102 trains the machine learning model 606 such as a neural network to have internal parameters such as weight and biases for generating a prediction 608 (e.g., a predicted topic, a predicted hybrid relevance score, or a predicted seed content item) based on training data.

As shown, the collection seeding system 102 accesses sample data 602 from a database 604 (e.g., the database 114). For example, the collection seeding system 102 determines sample data 602 such as sample content items, sample account activity, sample object classifications, or some other sample data to input into the machine learning model 606. In some embodiments, the collection seeding system 102 utilizes the machine learning model 606 to generate a prediction 608 from the sample data 602. Specifically, the machine learning model 606 generates a prediction 608 according to its internal parameters.

As part of training the machine learning model 606, the collection seeding system 102 performs a comparison 610. Specifically, the collection seeding system 102 compares the prediction 608 with an actual result 612 (e.g., a ground truth seed content item to compare with a predicted seed content item, a ground truth hybrid relevance score to compare with a predicted hybrid relevance score, or a ground truth topic to compare with a predicted topic). Indeed, the collection seeding system 102 accesses the actual result 612 from the database 604, where the actual result 612 is designated as corresponding to the sample data 602. In some cases, the collection seeding system 102 performs the comparison 610 using a loss function such as a mean squared error loss function or a cross entropy loss function to determine an error or a measure of loss associated with the machine learning model 606 (or between the prediction 608 and the actual result 612).

In one or more embodiments, the collection seeding system 102 further performs a parameter modification 614. Based on the comparison 610, the collection seeding system 102 modifies parameters of the machine learning model 606. For example, the collection seeding system 102 modifies parameters of the machine learning model 606 to reduce a measure of error or a loss associated with the machine learning model 606. The collection seeding system 102 can further repeat the process illustrated in FIG. 6 for many iterations or epochs until the machine learning model 606 satisfies a threshold measure of loss. For each iteration, the collection seeding system 102 generates new predictions from new sample data, performs a comparison, and modifies parameters (e.g., via back propagation) to improve predictions for subsequent iterations.

Figure 7:
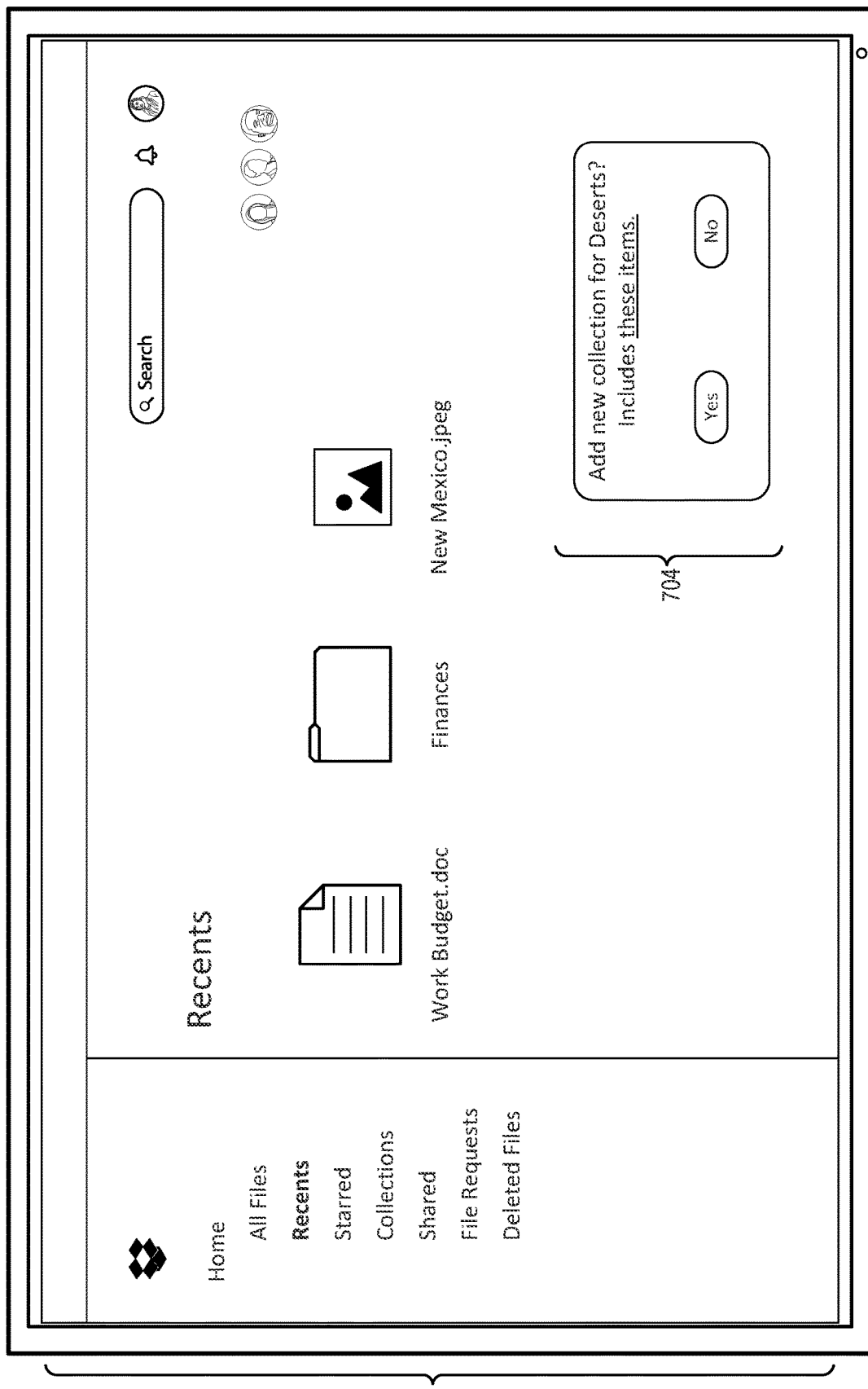
FIG. 7 illustrates an example user interface including a collection suggestion notification in accordance with one or more embodiments.

As mentioned above, in certain embodiments, the collection seeding system 102 generates and provides a notification for a suggested content collection. In particular, the collection seeding system 102 provides a notification for a suggested content collection for display on a client device associated with the user account of the content management system 106. FIG. 7 illustrates an example user interface including a notification for a suggested content collection in accordance with one or more embodiments.

As illustrated in FIG. 7, the collection seeding system 102 generates and provides a suggested collection notification 704 for display within a content management interface 702 on the client device 108. Indeed, based on generating or identifying a suggested content collection (or a suggested set of content items to add to an existing content collection), the collection seeding system 102 generates the suggested collection notification 704 to prompt addition of the content items. For example, the collection seeding system 102 generates the suggested collection notification 704 to include selectable options for accepting or declining the suggested content collection. In some embodiments, the collection seeding system 102 facilitates generating and addition of content items into a new or existing content collection based on a single interaction (e.g., a single click)

of an option to accept the suggested content collection. As shown, the suggested collection notification 704 further includes a link to view the suggested content items to include within the content collection.

Figure 8:
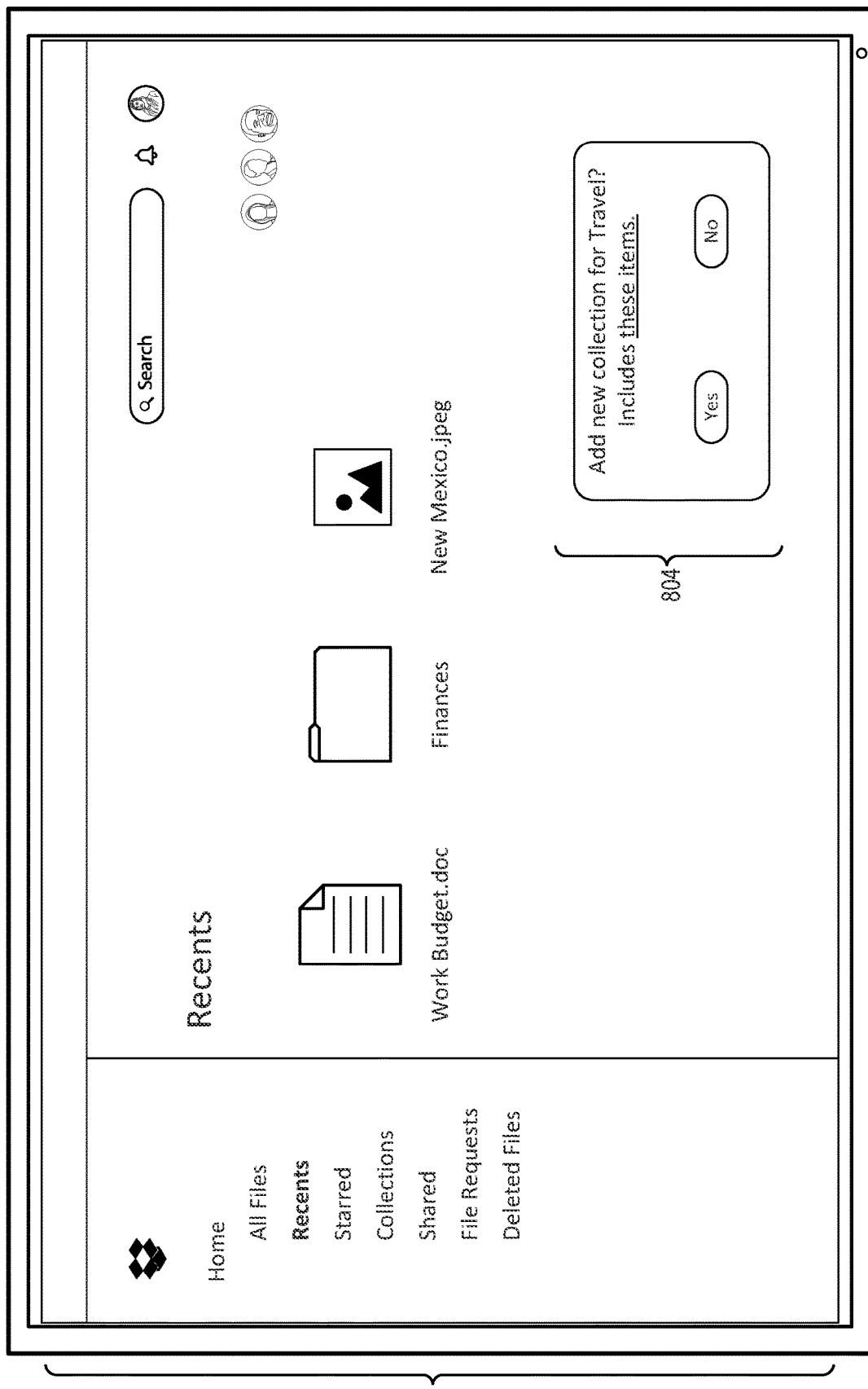
FIG. 8 illustrates an example user interface including a collection suggestion notification in accordance with one or more embodiments.

As mentioned, in some described embodiments, the collection seeding system 102 generates subsequent suggested content collections based on receiving user interaction with a suggested collection notification (e.g., the suggested collection notification 704). In particular, the collection seeding system 102 can generate additional similarly themed suggested content collections based on acceptance of a suggested content collection, and the collection seeding system 102 can generate a thematically different suggested content collection based on a rejection of a suggested content collection. FIG. 8 illustrates an example suggested collection notification for a thematically different suggested content collection in accordance with one or more embodiments.

As illustrated in FIG. 8, the client device 108 displays a content management interface 802 that includes a suggested collection notification 804. Compared to the suggested collection notification 704 of FIG. 7, the topic associated with the suggested content collections has changed from "Deserts" to "Travel" within the suggested collection notification 804. Indeed, based on receiving a rejection of the suggested content collection for the suggested collection notification 704, the collection seeding system 102 generates a new suggested content collection for a different germane topic and/or germane classification. Thus, the collection seeding system 102 generates and provides the suggested collection notification 804 for the thematically different suggested content collection.

To generate a thematically different suggested content collection, the collection seeding system 102 compares topics for content items with that of the seed content item used to generate the rejected content collection. The collection seeding system 102 selects a new seed content item that has at least a threshold measure of difference (or less than a threshold measure of similarity) in relation to the previous seed content item. In some embodiments, the collection seeding system 102 analyzes the content items in the suggested collection to determine a percentage or a proportion of content items that mention or reflect a particular topic or classification. If the percentage or proportion satisfies a theme threshold, the collection seeding system 102 determines the topic/classification to be thematic for the collection, and collection seeding system 102 selects a new seed content item that is not related to the thematic topic/classification. Thus, the collection seeding system 102 seeds generation of a new content collection based on a different germane topic.

The components of the collection seeding system 102 can include software, hardware, or both. For example, the components of the collection seeding system 102 can include one or more instructions stored on a computer-readable storage medium and executable by processors of one or more computing devices. When executed by one or more processors, the computer-executable instructions of the collection seeding system 102 can cause a computing device to perform the methods described herein. Alternatively, the components of the collection seeding system 102 can comprise hardware, such as a special purpose processing device to perform a certain function or group of functions. Additionally or alternatively, the components of the collection seeding system 102 can include a combination of computer-executable instructions and hardware.

Furthermore, the components of the collection seeding system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the collection seeding system 102 may be implemented as part of a stand-alone application on a personal computing device or a mobile device.

FIGS. 1-8, the corresponding text, and the examples provide a number of different systems and methods for generating and providing suggested content collections to user accounts of a content management system. In addition to the foregoing, implementations can also be described in terms of flowcharts comprising acts steps in a method for accomplishing a particular result. For example, FIG. 9 illustrates an example series of acts for generating and providing subgroupings of content items based on content synthesis and dynamic facets.

Figure 9:
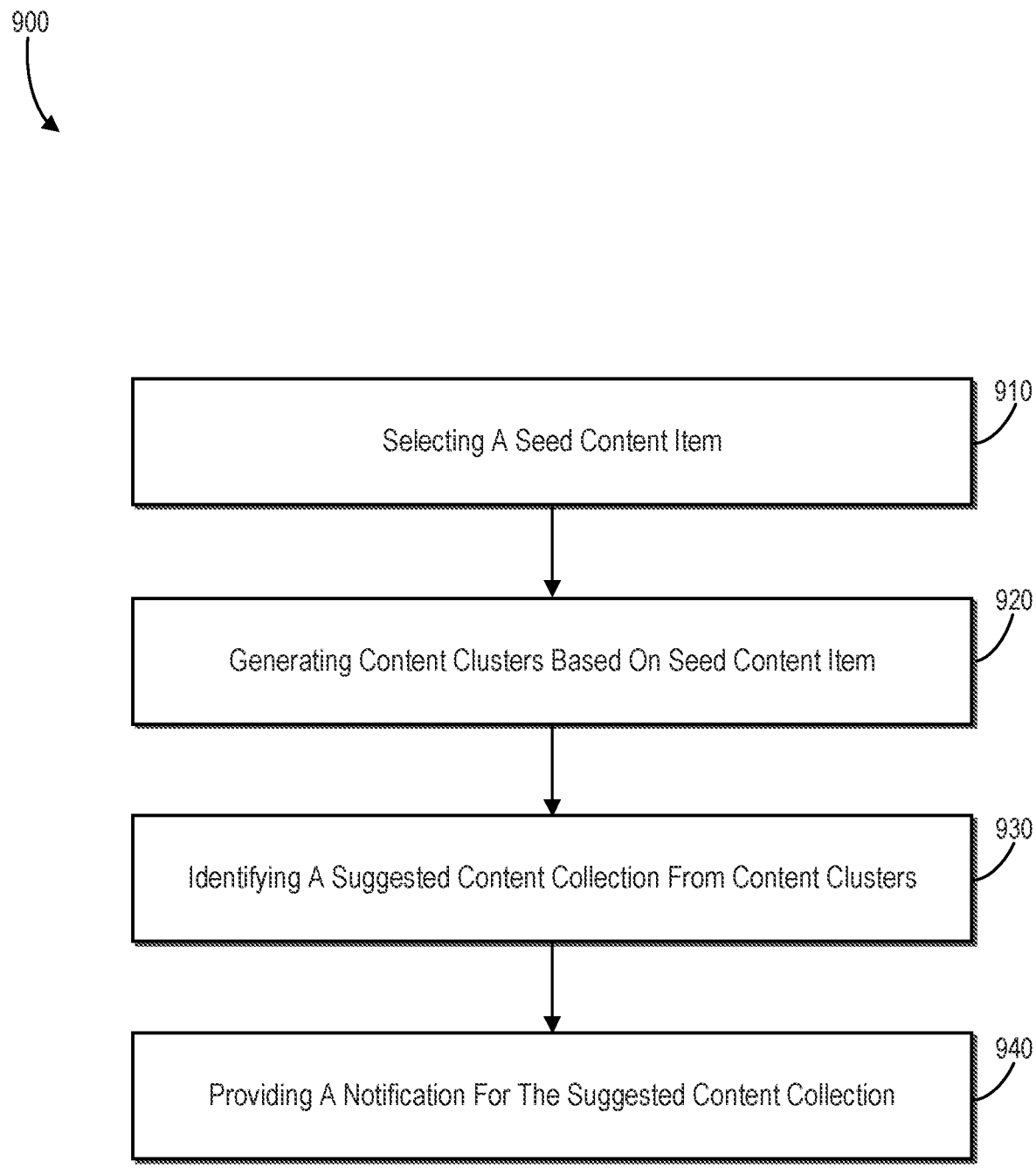
FIG. 9 illustrates a flowchart of a series of acts for generating and providing a suggested content collection in accordance with one or more embodiments.

While FIG. 9 illustrates acts according to certain implementations, alternative implementations may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further implementations, a system can perform the acts of FIG. 9.

As illustrated in FIG. 9, the series of acts 900 may include an act 910 of selecting a seed content item. The series of acts 900 may also include an act 920 of generating content clusters based on the seed content item. In addition, the series of acts 900 may include an act 930 of identifying a suggested content collection from the content clusters. Further, the series of acts 900 may include an act 940 of providing a notification for the suggested content collection.

In some embodiments, the series of acts 900 includes an act of selecting a seed content item for seeding generation of a content collection from a plurality of content items associated with a user account of a content management system. In addition, the series of acts 900 can include an act of generating, based on the seed content item, one or more content clusters from the plurality of content items associated with the user account. Indeed, the series of acts 900 can include an act of generating a content cluster seeded by the seed content item by clustering a set of content items from the plurality of content items associated with the user account. Further, the series of acts 900 can include an act of identifying a suggested content collection for the user account from the one or more content clusters seeded by the seed content item. The series of acts 900 can also include an act of providing a notification corresponding to the suggested content collection for display on a client device associated with the user account. For example, the series of acts 900 can include an act of providing, for display on a client device associated with the user account, a notification prompting addition of the suggested content collection to the user account within the content management system.

In one or more embodiments, the series of acts 900 includes an act of selecting the seed content item for seeding generation of the content collection by determining relevance scores for one or more content items within the plurality of content items associated with the user account and selecting the seed content item based on the relevance scores for the one or more content items. Further, the series of acts 900 can include an act of selecting the seed content item for seeding generation of the content collection by utilizing a seed prediction machine learning model to predict a content item from among the plurality of content items that the user account will access.

The series of acts 900 can include an act of determining the one or more content clusters by determining a germane topic from the seed content item based on relevance to the user account and clustering the plurality of content items in relation to the germane topic of the seed content item. In some cases, the series of acts 900 includes an act of determining the one or more content clusters by determining an object classification for an object depicted within the seed content item and clustering the plurality of content items in relation to the object classification of the seed content item.

In some embodiments, the series of acts 900 includes an act of generating the suggested content collection by ranking the one or more content clusters seeded by the seed content item based on relevance to the user account, selecting, based on ranking the one or more content clusters, a content cluster from the one or more content clusters for generating the suggested content collection, and generating, for the suggested content collection, a virtual folder comprising references to one or more content items within the content cluster selected based on ranking the one or more content clusters. The series of acts 900 can also include an act of providing the notification corresponding to the suggested content collection by providing, for display on the client device, an interface element selectable to, with a single client device interaction: generate a virtual folder for a new content collection associated with the user account within the content management system and add references to one or more content items within the suggested content collection to the virtual folder of the new content collection.

Further, the series of acts 900 can include an act of generating the content cluster seeded by the seed content item by clustering the set of content items based on: extracting topics from the plurality of content items, determining classifications for objects depicted within the plurality of content items, and comparing the topics and the classifications with a germane topic associated with the seed content item to identify the set of content items as corresponding to the seed content item. In addition, the series of acts 900 can include an act of generating the content cluster seeded by the seed content item by further identifying co-access patterns between the seed content item and the set of content items within the content cluster.

In some embodiments, the series of acts 900 includes an act of receiving a client device interaction from the client device declining the suggested content collection. The series of acts 900 can also include an act of, based on the client device interaction declining the suggested content collection, generating a new suggested content collection that thematically differs from the suggested content collection. Further, the series of acts 900 can include acts of identifying at least one archival content item within the plurality of content items and excluding the at least one archival content item from the suggested content collection.

In one or more embodiments, the series of acts 900 includes an act of generating the suggested content collection by identifying a subset of content items from the content cluster to suggest based on relevance to the user account. The series of acts 900 can also include an act of determining the one or more content clusters by: determining a first relevance score based on comparing a topic for a content item from the plurality of content items with a germane topic of the seed content item, determining a second relevance score based on comparing an object classification for the content item from the plurality of content items with the germane topic of the seed content item, and generating a combined relevance score by utilizing a hybrid relevance model to combine the first relevance score and the second relevance score.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
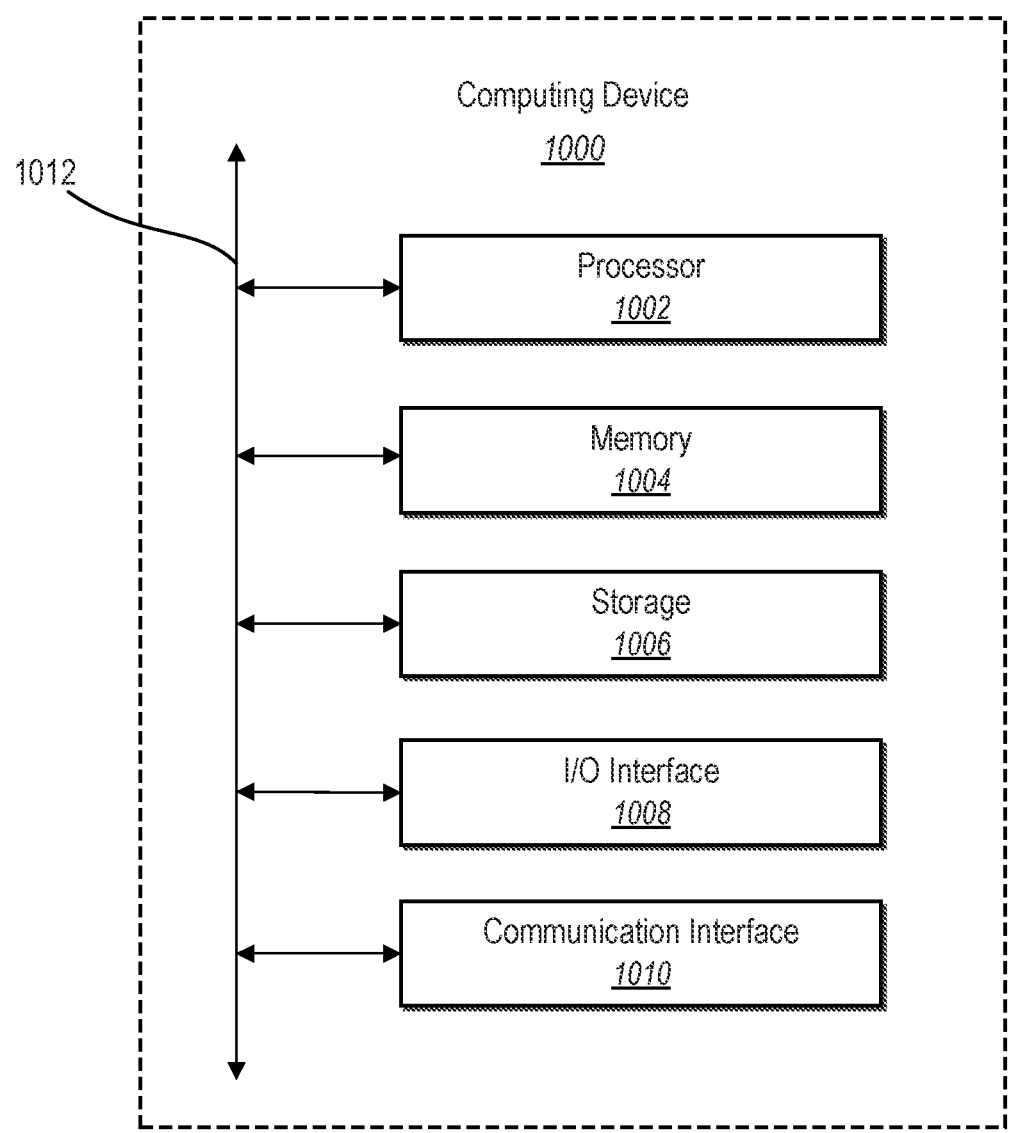
FIG. 10 illustrates a block diagram of an exemplary computing device in accordance with one or more embodiments.

FIG. 10 illustrates a block diagram of exemplary computing device 1000 (e.g., the server(s) 104 and/or the client device 108) that may be configured to perform one or more of the processes described above. One will appreciate that server(s) 104 and/or the client device 108 may comprise one or more computing devices such as computing device 1000. As shown by FIG. 10, computing device 1000 can comprise processor 1002, memory 1004, storage device 1006, I/O interface 1008, and communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other implementations. Furthermore, in certain implementations, computing device 1000 can include fewer components than those shown in FIG. 10. Components of computing device 1000 shown in FIG. 10 will now be described in additional detail.

In particular implementations, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular implementations, processor 1002 may include one or more internal caches for data, instructions, or addresses. As an example and not by way of limitation, processor 1002 may include one or more instruction caches, one or more data caches, and one or more translation lookaside buffers (TLBs). Instructions in the instruction caches may be copies of instructions in memory 1004 or storage device 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to computing device 1000. In particular implementations, storage device 1006 is non-volatile, solid-state memory. In other implementations, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 11:
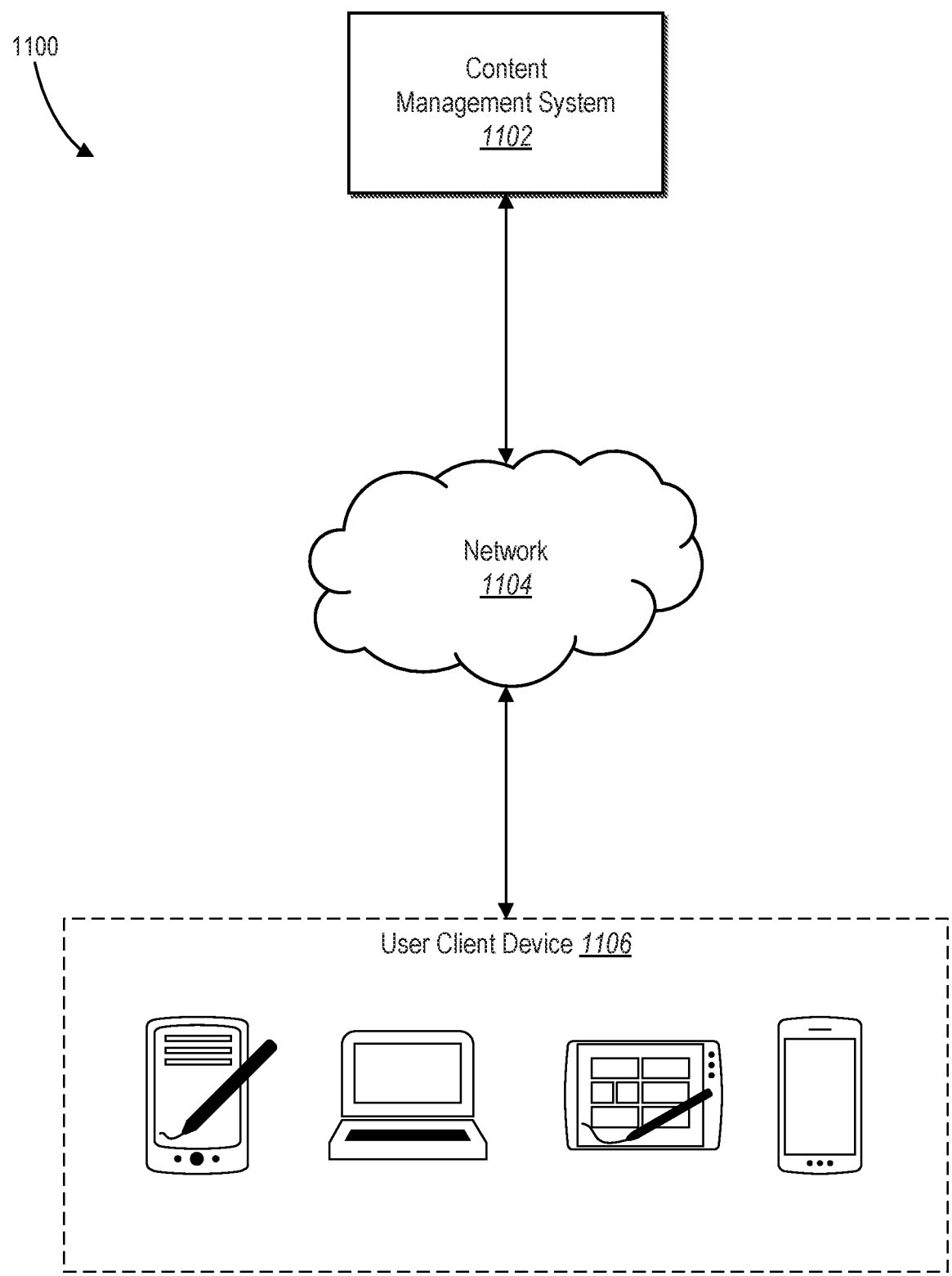
FIG. 11 illustrates an example environment of a networking system having the collection seeding system in accordance with one or more embodiments.

FIG. 11 is a schematic diagram illustrating environment 1100 within which one or more implementations of the collection seeding system 102 can be implemented. For example, the collection seeding system 102 may be part of a content management system 1102 (e.g., the content management system 106). Content management system 1102 may generate, store, manage, receive, and send digital content (such as digital content items). For example, content management system 1102 may send and receive digital content to and from client devices 1106 by way of network 1104. In particular, content management system 1102 can store and manage a collection of digital content. Content management system 1102 can manage the sharing of digital content between computing devices associated with a plurality of users. For instance, content management system 1102 can facilitate a user sharing a digital content with another user of content management system 1102.

In particular, content management system 1102 can manage synchronizing digital content across multiple client devices 1106 associated with one or more users. For example, a user may edit digital content using client device 1106. The content management system 1102 can cause client device 1106 to send the edited digital content to content management system 1102. Content management system 1102 then synchronizes the edited digital content on one or more additional computing devices.

In addition to synchronizing digital content across multiple devices, one or more implementations of content management system 1102 can provide an efficient storage option for users that have large collections of digital content. For example, content management system 1102 can store a collection of digital content on content management system 1102, while the client device 1106 only stores reduced-sized versions of the digital content. A user can navigate and browse the reduced-sized versions (e.g., a thumbnail of a digital image) of the digital content on client device 1106. In particular, one way in which a user can experience digital content is to browse the reduced-sized versions of the digital content on client device 1106.

Another way in which a user can experience digital content is to select a reduced-size version of digital content to request the full- or high-resolution version of digital content from content management system 1102. In particular, upon a user selecting a reduced-sized version of digital content, client device 1106 sends a request to content management system 1102 requesting the digital content associated with the reduced-sized version of the digital content. Content management system 1102 can respond to the request by sending the digital content to client device 1106. Client device 1106, upon receiving the digital content, can then present the digital content to the user. In this way, a user can have access to large collections of digital content while minimizing the amount of resources used on client device 1106.

Client device 1106 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access content management system 1102.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
identifying a plurality of candidate seed content items, wherein a seed content item from among the plurality of candidate seed content items seeds a content collection gathered from a plurality of content items associated with a user account of a content management system;
determining, from the plurality of candidate seed content items, the seed content item by utilizing a seed prediction machine learning model to predict access likelihoods for the plurality of candidate seed content items;
seeding, from the seed content item utilizing a hybrid relevance machine learning model, a suggested content collection comprising content items within a content cluster comprising a subset of the plurality of content items associated with the user account; and
providing a notification corresponding to the suggested content collection for display on a client device associated with the user account.

2. The computer-implemented method of claim 1, wherein determining the seed content item comprises predicting, using a seed prediction machine learning model, a content item with at least a threshold access probability by the user account.

3. The computer-implemented method of claim 1, wherein seeding the suggested content collection comprises:
generating a plurality of content clusters from germane topics associated with candidate seed content items from among the plurality of content items associated with the user account; and
selecting, from the plurality of content clusters, the content cluster comprising the subset of the plurality of content items based on comparing a germane topic of the seed content item with the germane topics of the candidate seed content items.

4. The computer-implemented method of claim 1, further comprising determining a germane topic from the seed content item by:
generating, utilizing a topic prediction machine learning model, one or more predicted topics associated with the seed content item from topic data extracted from the seed content item; and
determining a relevance score for the seed content item in relation to the user account based on user account activity indicating interactions by the user account with content items corresponding to the one or more predicted topics.

5. The computer-implemented method of claim 4, wherein generating the suggested content collection comprises determining content items corresponding to the germane topic to include within the content cluster of the suggested content collection.

6. The computer-implemented method of claim 1, wherein providing the notification for display comprises providing a suggested collection notification comprising a selectable option to add the suggested content collection to the user account within the content management system.

7. The computer-implemented method of claim 1, further comprising:
receiving, from the client device, a selection of an option within the notification to add the suggested content collection to the user account; and
in response to the selection, adding the suggested content collection to data stored for the user account within the content management system.

8. A system comprising:
at least one processor; and
a non-transitory computer readable medium comprising instructions that, when executed by the at least one processor, cause the system to:
identify a plurality of candidate seed content items, wherein a seed content item from among the plurality of candidate seed content items seeds a content collection gathered from a plurality of content items associated with a user account of a content management system;
determine, from among the plurality of candidate seed content items, the seed content item by utilizing a seed prediction machine learning model to predict access likelihoods for the plurality of candidate seed content items;
seed, from the seed content item utilizing a hybrid relevance machine learning model, a suggested content collection comprising content items within a content cluster comprising a subset of the plurality of content items associated with the user account; and provide a notification corresponding to the suggested content collection for display on a client device associated with the user account.

9. The system of claim 8, further comprising instructions that, when executed by the at least one processor, cause the system to determine the seed content item from among the plurality of candidate seed content items by:
   generating a content cluster for a candidate seed content item from among the plurality of candidate seed content items;
   determining a cluster center for the content cluster; and
   comparing the cluster center with a germane topic associated with the user account.

10. The system of claim 8, further comprising instructions that, when executed by the at least one processor, cause the system to determine the seed content item by predicting, using a seed prediction machine learning model, a content item with at least a threshold access probability by the user account.

11. The system of claim 10, further comprising instructions that, when executed by the at least one processor, cause the system to generate the suggested content collection by:
   generating a plurality of content clusters from germane topics associated with candidate seed content items from among the plurality of content items associated with the user account; and
   selecting, from among the plurality of content clusters, the content cluster comprising the subset of the plurality of content items based on a germane topic of the seed content item.

12. The system of claim 8, further comprising instructions that, when executed by the at least one processor, cause the system to determine a germane topic from the seed content item by:
   generating, utilizing a topic prediction machine learning model, one or more predicted topics associated with the seed content item from topic data extracted from the seed content item; and
   determining a relevance score for the seed content item in relation to the user account based on user account activity indicating interactions by the user account with content items corresponding to the one or more predicted topics.

13. The system of claim 12, further comprising instructions that, when executed by the at least one processor, cause the system to generate the suggested content collection by determining content items corresponding to the germane topic to include within the content cluster of the suggested content collection.

14. The system of claim 8, further comprising instructions that, when executed by the at least one processor, cause the system to:
   receive, from the client device, a selection of an option within the notification to add the suggested content collection to the user account; and
   in response to the selection, add the suggested content collection to data stored for the user account within the content management system.

15. A non-transitory computer readable medium comprising instructions that, when executed by at least one processor, cause the at least one processor to:
   determine, for a user account of a content management system, a content item repository and user account behavior indicating interactions by the user account with content items within the content item repository;
   identify a plurality of candidate seed content items, wherein a seed content item from among the plurality of candidate seed content items seeds a content collection gathered from a plurality of content items associated with the user account of the content management system;
   predict, utilizing a seed prediction machine learning model to process the user account behavior and the content item repository, the seed content item, from the plurality of candidate seed content items, with at least a threshold access probability by the user account;
   seed a content cluster using the seed content item by clustering together content items from the content item repository relating to a topic of the seed content item; and
   generate a suggested content collection for the user account based on the content cluster.

16. The non-transitory computer readable medium of claim 15, further comprising instructions that, when executed by the at least one processor, cause the at least one processor to predict the seed content item by:
   determining, utilizing the seed prediction machine learning model, access probabilities for a plurality of content items within the content item repository of the user account, wherein an access probability indicates a probability that the user account will access a content item within a timeframe; and
   comparing the access probabilities for the plurality of content items.

17. The non-transitory computer readable medium of claim 15, further comprising instructions that, when executed by the at least one processor, cause the at least one processor to generate the content cluster by:
   determining a germane topic from the seed content item based on user account activity indicating interactions by the user account with content items of a topic shared by the seed content item;
   filtering the content item repository to identify, from the content item repository, a subset of content items corresponding to the germane topic; and
   generating the content cluster from the subset of content items by selecting content items with relevance scores that satisfy a relevance threshold in relation to the germane topic.

18. The non-transitory computer readable medium of claim 15, further comprising instructions that, when executed by the at least one processor, cause the at least one processor to generate the suggested content collection by:
   comparing a relevance score of the content cluster seeded by the seed content item with relevance scores of other content clusters seeded by other seed content items; and
   selecting one or more content items from the content cluster to include within the suggested content collection based on comparing the relevance scores.

19. The non-transitory computer readable medium of claim 15, further comprising instructions that, when executed by the at least one processor, cause the at least one processor to provide a notification corresponding to the suggested content collection for display on a client device associated with the user account.

20. The non-transitory computer readable medium of claim 19, further comprising instructions that, when executed by the at least one processor, cause the at least one processor to:
   receive, from the client device, a selection of an option within the notification to add the suggested content collection to the user account; and in response to the selection, add the suggested content collection to content item repository of the user account within the content management system.

\* \* \* \* \*